United States Patent
Abner et al.

(10) Patent No.: US 9,399,552 B1
(45) Date of Patent: Jul. 26, 2016

(54) WASTE COMPACTOR SYSTEM FOR VEHICLES

(71) Applicant: MSW POWER CORPORATION, Acton, MA (US)

(72) Inventors: Joseph Abner, Middleboro, MA (US); Stephen Armstrong, Andover, MA (US); Steven Chase, Hanover, MA (US); David Rich, Upton, MA (US); Matthew Young, Westford, MA (US); Aaron Salter, Newton, MA (US); Stuart Haber, Lincoln, MA (US); William Dalpe, Rehoboth, MA (US)

(73) Assignee: MSW Power Corporation, Acton, MA (US)

( * ) Notice: Subject to any disclaimer, the term of this patent is extended or adjusted under 35 U.S.C. 154(b) by 0 days.

(21) Appl. No.: 14/869,081

(22) Filed: Sep. 29, 2015

Related U.S. Application Data

(63) Continuation-in-part of application No. 14/614,812, filed on Feb. 5, 2015, now Pat. No. 9,174,406.

(51) Int. Cl.
*B30B 9/04* (2006.01)
*B30B 9/06* (2006.01)
(Continued)

(52) U.S. Cl.
CPC .............. *B65F 3/14* (2013.01); *B01D 29/6484* (2013.01); *B01D 35/02* (2013.01); *B30B 9/04* (2013.01);
(Continued)

(58) Field of Classification Search
CPC ............ B30B 9/02; B30B 9/04; B30B 9/047; B30B 9/06; B30B 9/3039; B30B 9/3059; B30B 9/3014; B30B 9/3042; B30B 9/3032; B30B 9/3057; B30B 15/34; B01D 33/466; B01D 33/0067; B01D 33/46; B01D 35/02; B01D 29/6484; B65F 3/201; B65F 3/28; B65F 2210/1023; B65F 2003/146; B65F 3/14

USPC .......... 100/73, 100, 104, 110, 112, 116, 126, 100/127, 130, 131; 414/525.2, 525.6
See application file for complete search history.

(56) References Cited

U.S. PATENT DOCUMENTS 2,002,993 A   5/1935   Ehrick et al.
2,109,559 A   3/1938   Wickert, Jr.
(Continued)

FOREIGN PATENT DOCUMENTS

CN   203094909   7/2013
CN   203486425   3/2014
(Continued)

OTHER PUBLICATIONS

Sebright Products, Inc.—"Speciality Compaction Equipment", pp. 1-5.
(Continued)

*Primary Examiner* — Jimmy T Nguyen
(74) *Attorney, Agent, or Firm* — Occhiuti & Rohlicek LLP

(57) ABSTRACT

A vehicle for collecting and compacting waste for disposal including a compaction chamber, configured to receive and compact waste, having an opening for inserting waste to be compacted and a plurality of apertures in at least one internal surface of the compaction chamber. The compactor is configured to apply pressure to the waste in the compaction chamber to reduce the volume of the waste. When the compactor applies pressure to the waste, liquid and residual solid waste exits the compaction chamber through the plurality of apertures. There is a liquid collection system, configured to collect the liquid and the residual solid waste from the plurality of apertures and the liquid collection system includes an evaporation system configured to evaporate at least a portion of the liquid removed from the waste.

28 Claims, 22 Drawing Sheets

(51) Int. Cl.
*B30B 9/30* (2006.01)
*B65F 3/14* (2006.01)
*B01D 35/02* (2006.01)
*B01D 29/64* (2006.01)
*B30B 15/34* (2006.01)

(52) U.S. Cl.
CPC ............... *B30B 9/06* (2013.01); *B30B 9/3032* (2013.01); *B30B 9/3039* (2013.01); *B30B 9/3042* (2013.01); *B30B 9/3057* (2013.01); *B30B 15/34* (2013.01); *B65F 2003/146* (2013.01)

(56) References Cited

U.S. PATENT DOCUMENTS

| | | |
|---|---|---|
| 3,789,752 A | 2/1974 | Wirz |
| 3,861,117 A | 1/1975 | DeFilippi |
| 4,387,633 A | 6/1983 | Ballantyne |
| 4,467,715 A | 8/1984 | Bunger |
| 4,627,365 A | 12/1986 | Tseng |
| 4,706,560 A | 11/1987 | Capodicasa |
| 5,020,321 A | 6/1991 | Lord |
| 5,146,848 A * | 9/1992 | Dufour ................ B30B 9/067 100/110 |
| 5,178,062 A | 1/1993 | Spiers |
| 5,207,994 A | 5/1993 | Suzuki et al. |
| 5,215,007 A | 6/1993 | Sebright et al. |
| 5,400,726 A * | 3/1995 | Dumons ................ B03B 9/06 100/102 |
| 5,762,758 A | 6/1998 | Hoffman |
| 5,887,516 A | 3/1999 | Sebright et al. |
| 6,298,576 B1 | 10/2001 | La Gioia |
| 6,640,701 B2 * | 11/2003 | Hoffjann ................ B30B 9/06 100/110 |
| 6,684,764 B2 | 2/2004 | Sebright et al. |
| 6,945,180 B1 | 9/2005 | Khymych |
| 7,272,895 B2 | 9/2007 | La Gioia |
| 7,722,739 B2 | 5/2010 | Haslem et al. |
| 2005/0098049 A1 | 5/2005 | Shepherd |
| 2010/0287896 A1 | 11/2010 | Terra |
| 2010/0293846 A1 | 11/2010 | Shaffer |
| 2011/0259210 A1 | 10/2011 | Reed et al. |
| 2012/0145012 A1 | 6/2012 | Koenig et al. |
| 2013/0160662 A1 | 6/2013 | Correale, Jr. |
| 2013/0326938 A1 | 12/2013 | French et al. |

FOREIGN PATENT DOCUMENTS

| | | |
|---|---|---|
| DE | 4117420 | 12/1992 |
| WO | PCT/US2004/018290 | 3/2005 |

OTHER PUBLICATIONS

Sebrigth Products, Inc. Engineered Right, Built Right, Installed Right, Serviced Right—by Sebright—Super Heavy Weight Compactors, pp. 1-2.
Sebright Products, Inc.—High Density Extruders—pp. 1-4.
Environmental Solutions Group, RJ-30 High-Density Compactor Extruder, pp. 1-2.

* cited by examiner

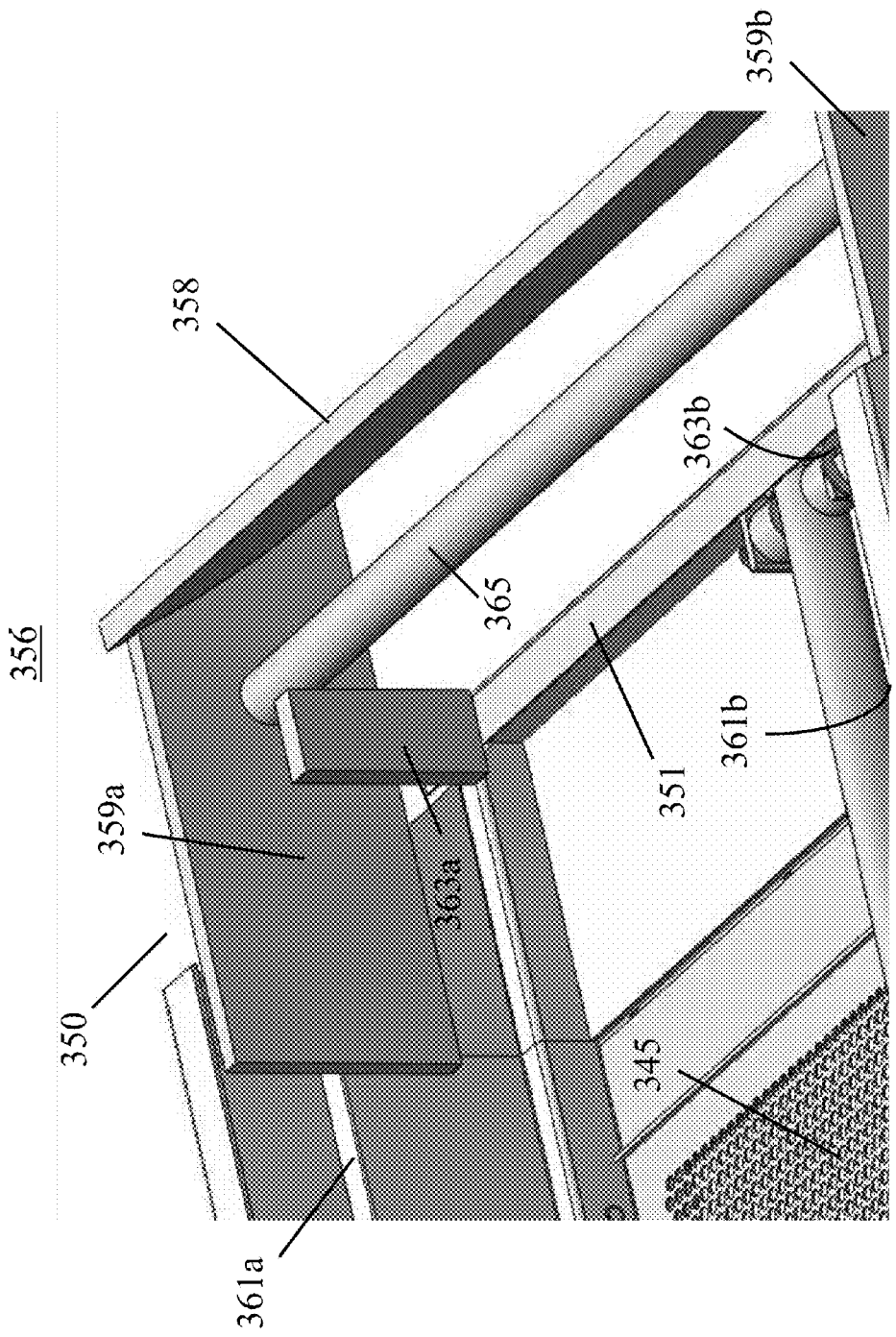

WASTE COMPACTOR SYSTEM FOR VEHICLES

CROSS-REFERENCE TO RELATED PATENT APPLICATIONS

This application is a continuation in part of U.S. application Ser. No. 14/614,812 filed on Feb. 5, 2015, the contents of which are hereby incorporated by reference in their entirety.

FIELD OF INVENTION

The present invention relates to a waste compactor system directed to substantially reducing the weight and volume of compacted waste in order to minimize waste removal and disposal costs and more specifically to such a system integrated into a waste compactor vehicle.

BACKGROUND

Compactors used for compacting waste have been well known for many years. These compactors utilize a hydraulic ram positioned in a chamber to compact the waste into a denser form. The hydraulic ram compacts the waste against a solid surface within the chamber. In addition to compacting the solid material, a portion of the liquid contained in the waste material may be extracted from the solid waste when pressure is applied by the hydraulic ram. The extracted liquid is discharged from the chamber via drainage slots, grates or holes located in the chamber. Self-contained compactors are typically used for the storage and removal of solid waste containing liquid waste. By regulation, these compactors are designed so that the compactor is attached to a waste container for storage of the compacted waste and the entire system is hauled to the waste disposal site. This eliminates any cross-contamination between the liquid waste and the environment while disposing of the waste. During the compaction process, waste is reduced in volume by removing the air voids located within the waste bulk. A typical compaction ratio of the waste achieved is 3:1.

The compaction of waste is economically advantageous because it significantly reduces the cost of waste disposal for large producers of waste, such as supermarkets, malls, large restaurants, hotels, hospitals and institutions. However, the costs are still significant. One cost associated with waste disposal is the tipping fee, which is based on the number of instances a waste hauler needs to empty a waste container. This cost may be reduced using a compaction process as it allows for more waste to be stored in a waste container, thereby reducing the number of times a waste hauler needs to empty the waste unit. Another cost is the disposal fee, which is based on the overall weight of the waste stored in the waste container. This cost can be minimized by removing liquid from the waste, thereby reducing the disposal weight.

However, the liquid removed from the waste must be disposed of as well. Liquid waste is typically removed from the compaction chamber either via a pumping mechanism or gravimetrically. The liquid waste is maintained in a separate vessel to be disposed by maintenance personnel or a third party vendor off-site. Disposing of this extracted liquid waste off-site induces further costs however these costs are still substantially less than the fees associated with maintaining the liquid waste within the solid waste. Further issues that arise with extracting the liquid waste during compaction and later disposing of the liquid waste off-site include the requirement of additional footprint for liquid waste storage on-site and the logistics for the solid waste generator to store the liquid waste.

Certain waste compactor systems have incorporated liquid evaporation in order to dispose of the liquid waste on-site after being extracted from the solid waste during compaction. These systems address, to some extent, the issues described above. However, the evaporation techniques utilized in the aforementioned compaction systems are limiting because either they fail to substantially dispose of all the extracted waste liquid, they rely solely on electrically powered heating elements which require a significant amount of energy, or they vaporize the liquid waste by heating the liquid beyond its boiling point. Furthermore, in some instances, the evaporation is performed within the compaction chamber which is not suitable for treating industrial and municipal solid waste containing plastics or other waste with a comparable melting point. Therefore, prior art compactor systems do not provide an overall cost effective and energy efficient solution for waste disposal.

SUMMARY

In one aspect, the invention features a vehicle for collecting and compacting waste for disposal. The vehicle includes a compaction chamber, configured to receive and compact waste, including an opening for inserting waste to be compacted and a plurality of apertures in at least one internal surface of the compaction chamber. There is a compactor, configured to apply pressure to the waste in the compaction chamber to reduce a volume of the waste, wherein, when the compactor applies pressure to the waste, liquid and residual solid waste exits the compaction chamber through the plurality of apertures. There is a liquid collection system, configured to collect the liquid and the residual solid waste from the plurality of apertures, wherein the liquid collection system includes an evaporation system configured to evaporate at least a portion of the liquid removed from the waste.

In other aspects of the invention, one or more of the following features may be included. The liquid collection system may further include a filter unit configured to receive the liquid and the residual solid waste from the plurality of apertures, the filter unit including a filter through which the liquid passes, the residual solid waste remaining on a surface of the filter. The filter unit may further include a first end, a second end, and a scraper device, the filter being positioned between the first end and the second end, and the second end including an opening in communication with the compaction chamber; wherein the scraper device is configured to travel in an extension mode from the first end to the second end across the surface of the filter to remove the residual solid waste from the filter and force the residual solid waste out of the opening of the second end and into the compaction chamber and to travel in a retraction mode from the second end to the first end. The filter unit may further include a closure assembly for sealing the opening in the second end, wherein the closure assembly is configured to open when the scraper device forces the residual solid waste out of the filter unit into the compaction chamber through the opening in the extension mode and wherein the closure assembly is configured to close after the scraper device travels to a position within the opening in the retraction mode. The filter unit may include a first actuator interconnected to the scraper device and configured to extend the scraper device in the extension mode from a retracted position proximate the first end to an extended position to cause the scraper device to remove the residual solid waste from the filter and force it out of the opening of the filter unit and configured to retract the scraper device in the retraction mode from the extended position proximate the second end to the retracted position. The closure assembly may include a door and at least one spring affixed to the door to bias the door in a closed position, and wherein the scraper device may open the door as it is forced against the door when it moves to the extended position in the extension mode and the door may close due to the spring bias as the scraper devices moves toward the retracted position in the retraction mode. The filter unit may further include a pair of guide members each having a top and a bottom surface, the guide members being disposed on opposite sides of the surface of the filter and extending from proximate the first end to proximate the second end of the filter unit. The scraper device may travel under the bottom surfaces of the guide members as the scraper devices moves from the retracted position to the extended position in the extension mode to maintain contact between the scraper device and the filter and the scraper device may be in contact with the top surfaces of the guide members as the scraper device moves from the extended position to the retracted position in the retraction mode to maintain separation between the scraper device and the filter. The filter unit may further include a second actuator, configured to move the scraper device away from the surface of the filter and position the scraper device on the top surfaces of the guide members as the scraper devices moves from the extended to the retracted position in the retraction mode to maintain separation between the scraper device and the surface of the filter. The bottom surfaces of the guide members may be positioned a distance less than or equal to a height of the scraper device from the surface of the filter to provide a downward force from the scraper device on the surface of the filter as the scraper device travels in an extension mode from the first end to the second end across the filter.

In yet other aspects of the invention, one or more of the following features may be included. The plurality of apertures may have a width ranging from ¼ inch to 1/32 inches. The filter may comprise a filter material having a plurality of openings with a width ranging from 0.01 inch to 0.05 inch. The filter may further comprise a perforated plate to support the filter material. The liquid collection system may further comprise a liquid collection chamber in communication with the filter unit, the liquid collection chamber configured to receive the liquid from the filter unit. The evaporation system may include an evaporation chamber in communication with the liquid collection chamber and configured to receive and evaporate the liquid. The evaporation chamber may include at least one nozzle through which the liquid from the liquid collection chamber flows to produce a spray in the evaporation chamber. The evaporation chamber includes a first heater to heat the spray to at least above 32 degrees F., and more specifically to approximately 140 degrees F., to cause the spray to evaporate. The first heater may include an aperture for receiving the exhaust gas of the vehicle to provide heat. The first heater may have a surface area and the first heater includes one or more fins to increase the surface area of the first heater. The evaporation system may include a second heater to preheat the liquid prior to the liquid flowing through the nozzle. The second heater may include an aperture for receiving the exhaust gas of the vehicle to provide heat. The second heater may have a surface area and the second heater includes one or more fins to increase the surface area of the second heater. The evaporation system may include a line interconnecting the evaporation chamber to the compaction chamber to transport un-evaporated liquid from the evaporation chamber to the compaction chamber. There may be a line for transporting the liquid between the liquid collection system and the evaporation chamber and a first filtration unit disposed in the line to remove particles from the liquid. The liquid may be transported from the liquid collection system to the evaporation chamber by a pump. The size of the particles removed by the first filtration unit may range from 0.5 micron to 5 microns. There may further be included a second filtration unit disposed in the line to remove hydrocarbons and odor from the liquid and wherein the second filtration unit comprises activated carbon.

In another aspect of the invention there is a vehicle for collecting and compacting waste for disposal, including a vehicle frame and a compaction system mounted on the vehicle frame. The compaction system includes a compaction chamber, configured to receive and compact waste, including an opening for inserting waste to be compacted and a plurality of apertures in at least one internal surface of the compaction chamber. There is a compactor, configured to apply pressure to the waste in the compaction chamber to reduce a volume of the waste, wherein, when the compactor applies pressure to the waste, liquid and residual solid waste exits the compaction chamber through the plurality of apertures. There is a liquid collection system, configured to collect the liquid and residual solid waste from the plurality of apertures, wherein the liquid collection system includes a filter unit and an evaporation system configured to evaporate at least a portion of the liquid removed from the waste. The filter unit is configured to separate the liquid and the residual solid waste, the filter unit including an opening in communication with the compaction chamber to enable the residual solid waste to be moved into the compaction chamber.

An object of the invention is to reduce hauling and disposal costs by substantially reducing the weight and volume of the waste.

A further object of the invention is to provide a high pressure compaction system to substantially reduce the volume of waste produced and to extract a considerable amount of the liquid from the waste to substantially reduce the weight of the compacted waste.

A further object of the invention is to provide a waste compactor system with optimized compaction, liquid removal and energy efficiency.

A further object of the invention is to provide a waste compactor system with the above features integrated into a waste compactor vehicle.

Additional objects and advantages of the invention will become apparent as the following description proceeds; and the features of novelty which characterize the invention will be pointed out with particularity in the claims annexed to and forming a part of this specification.

BRIEF DESCRIPTION OF THE DRAWINGS

FIG. 14 is a perspective view of the opened closure assembly of the waste compaction system of FIG. 10;

DETAILED DESCRIPTION

Figure 1:
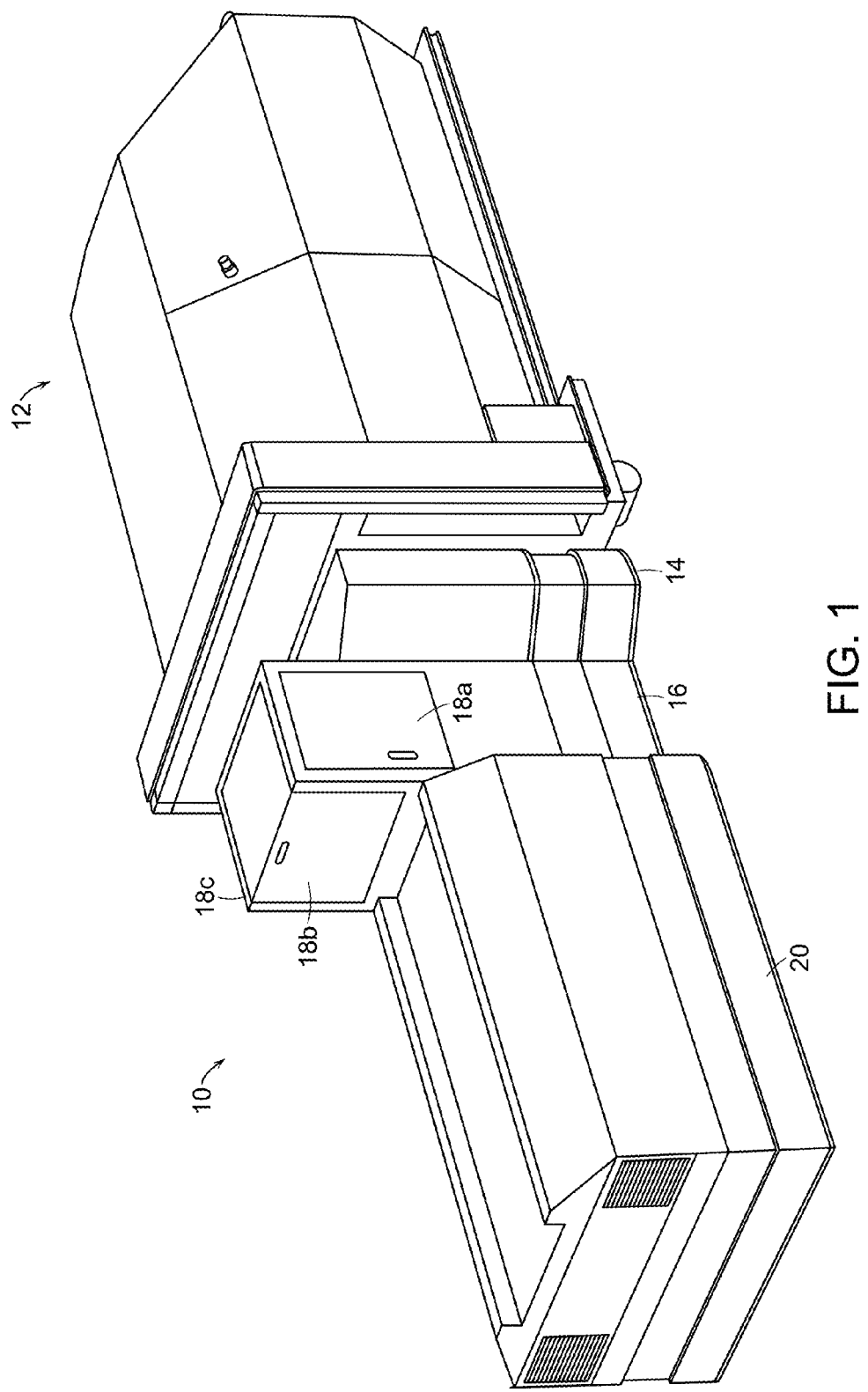
FIG. 1 is a perspective view of a waste compactor system according to this invention.

Waste compactor 10, FIG. 1, according to this invention is shown interconnected to a typical commercial waste container 12, which by regulation has the dimensions of 96 inch width×154 inch length×80 inch height. Waste container 12 can be removed from waste compactor 10 for transportation and disposal by a waste hauler.

Waste container 12 includes an opening (not shown) with dimensions of 64.5 inch width×46.5 inch height for receiving waste from waste compactor 10. The output opening of waste compactor 10 has smaller dimensions than the opening of waste container 12 and therefore includes an interface plate (described below), contained in housing 14, of similar dimensions to the opening in waste container 12 to enable the interface and interconnection of waste compactor 10 and waste container 12. A gasket (not shown) between the waste container 12 and the interface plate is typically included. There is a compaction housing 16 within which the waste compaction occurs.

Compaction housing 16 includes feeding doors 18a-c through which waste is inserted for compaction. Housing 20 includes other components of waste compactor system 10, such as the ram assembly, actuator, and liquid collection and evaporation system, which are all described in more detail below.

Waste compactor 10 and waste container 12 are typically stored on-site at facilities that are generators of significant amounts of waste materials. In some applications, the solid waste generated often has a fairly significant liquid component in the form of oils, water and other liquids, which greatly adds to the overall weight of the waste. When full, the waste container 12 is hauled away by a waste hauler to a waste facility for disposal.

Each time the waste hauler transports a waste container for disposal there is an associated hauling fee, which is referred to as a tipping fee. For a given period of time, the overall cost to dispose of the producer's waste is thus dependent on the number of instances a waste hauler needs to empty the waste container. This cost may be reduced by the use of on-site waste compaction, which allows for more waste to be stored in a waste unit, therefore reducing the number of times a waste hauler needs to empty the unit.

Another cost associated with the removal of the waste is the disposal fee, which is based on the overall weight of the waste stored in the waste unit. The liquid component in the waste significantly adds to the weight of the waste and thus the overall disposal cost. The disposal cost may be reduced by removing the liquid from the waste on-site before transporting the waste container. However, the liquid removed from the waste must then be separately disposed of which, while less costly than transporting it with the solid waste, still involves an associated liquid disposal cost.

Waste compactor 10 provides a more cost effective way of disposing waste by a) significantly reducing the size of the waste by using a high pressure compacting system, b) significantly reducing the weight of the waste by extracting liquid from the solid waste and disposing of the liquid on-site, and c) by reducing the cost of disposing the extracted liquid by evaporating a portion of the extracted liquid on site. More specifically, all of the waste liquid with a vapor pressure greater to or equal to water will be evaporated. The liquid with a vapor pressure less than water will be stored in a container and disposed of by a third party. In addition, these objectives are met while maximizing energy efficiency. A preferred embodiment, which achieves the above objectives, is described in more detail below.

Figure 2:
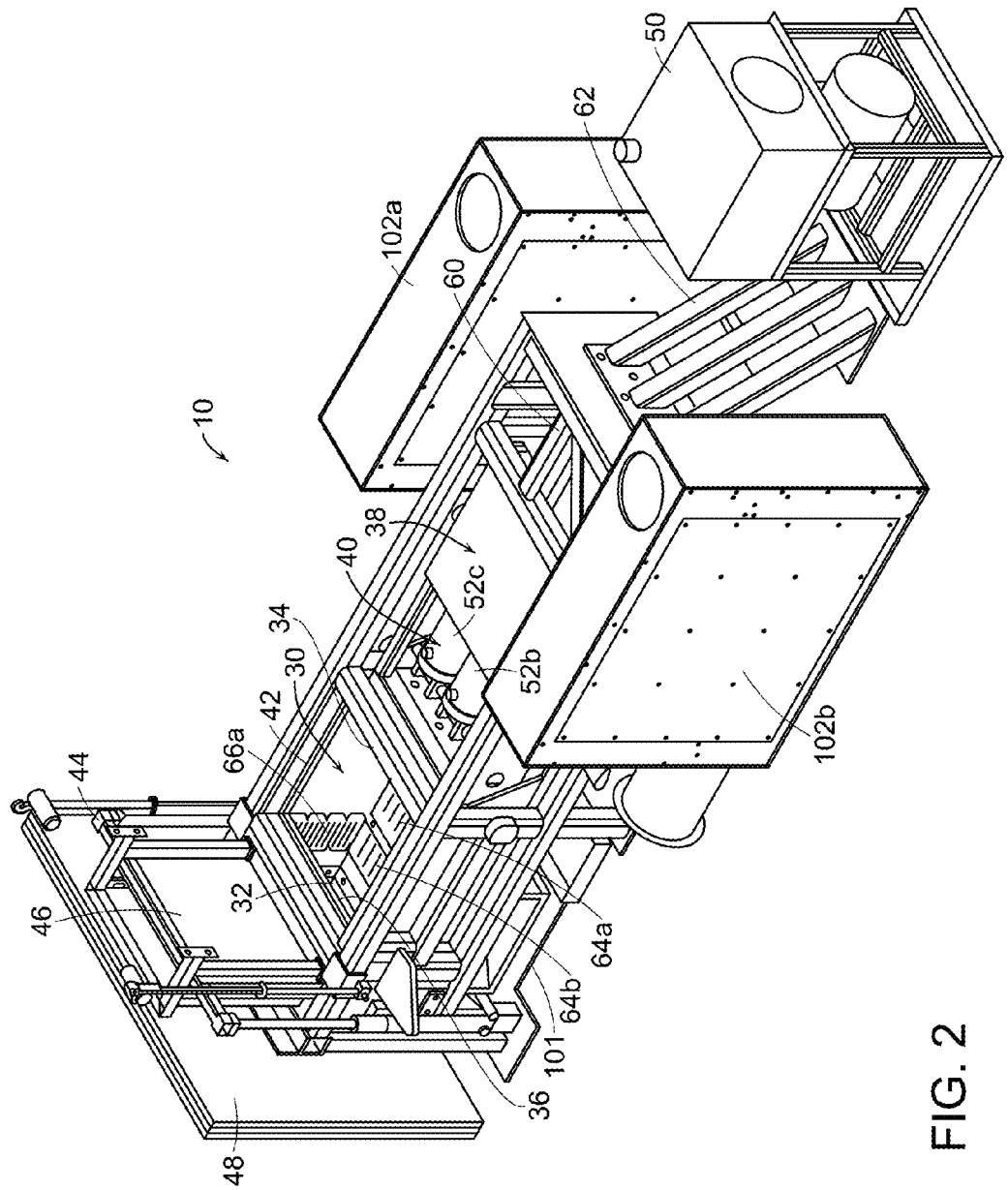
FIG. 2 is a perspective view of the waste compactor of FIG. 1 with the external housing removed so the components of the system are visible.

In FIG. 2, there is shown a compaction chamber 30 enclosed within housing 16, FIG. 1. Compaction chamber 30 has a first end 32 and a second end 34. Proximate first end 32 is a first opening 36 through which compacted waste may be transferred into waste container 12. Proximate the second end 34 of compaction chamber 30 is ram assembly 38 which is interconnected to actuator system 40. Actuator system 40 moves ram assembly 38 from a retracted position (as shown in FIG. 2), where it is located proximate the second end 34 of compaction chamber 30 to an extended position located proximate the first end 32 of the compaction chamber 34. Ram assembly 38 and actuator system 40 are contained within housing 20 shown in FIG. 1. The top plate of ram assembly 38 is removed in this figure so that components of actuator system 40 are visible.

Compaction chamber 30 also has a second opening 42 into which waste to be compacted may be inserted by an operator. The waste is inserted through opening 42 by opening either door 18a, 18b, or 18c in housing 16 shown in FIG. 1. When the waste has been inserted into compaction chamber 30, the operator may activate the waste compactor to begin a compaction mode to compact the waste into compacted waste units or blocks which are formed by the pressure exerted on the waste by the ram assembly 38 as it compacts the waste in the compaction chamber 30 against a closure assembly 44, which includes a gate 46.

Gate 46 is shown in the open position in FIG. 2; however, it would be in the closed or sealed position during the compaction mode. Once the waste is compacted into a compacted waste unit or block gate 46 is opened and ram assembly 38 is activated to move the compacted waste unit through closure assembly 44 and through an opening in an interface plate 48 into waste container 12. Interface plate 48 is affixed to closure assembly 44, and enables the interface of waste compactor 10 with waste container 12.

Figure 3A:
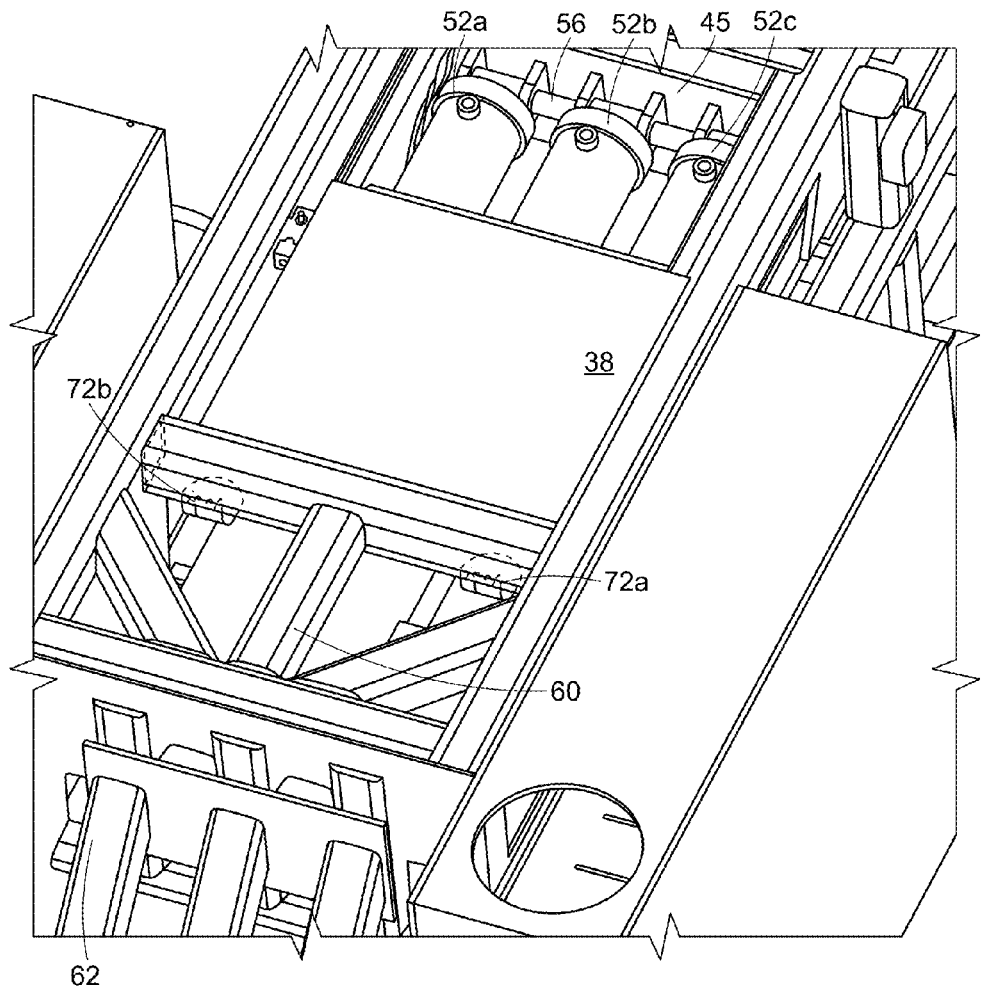
FIGS. 3A-C are perspective views of the ram and actuator assemblies.

Actuator system 40 includes a hydraulic system 50 which includes a pump and a reservoir that are interconnected to hydraulic cylinders 52a-c, depicted in more detail in FIG. 3A. Hydraulic system 50 may also include a flow divider to ensure an equal amount of hydraulic fluid is distributed to hydraulic cylinders 52a-c. The cylinders 52a-c are located within the interior 54, FIG. 3C, of ram assembly 38 and a piston of each cylinder is affixed to ram assembly 38 via a single common coupler 45. To secure the cylinders to the coupler, rod 56 passes through the apertures in common coupler 45 and through apertures at the ends of the pistons in cylinders 52a-52c. Waste compactor 10 is designed to produce very high pressure compaction, on the order of more than 100 psi on the compaction surface 58, FIG. 3B, of ram assembly 38 and even up to as much as 570 psi. A hydraulic pressure of approximately 3000 psi of pressure would be required for 570 psi of pressure on compaction surface 58 of ram assembly 38. At these pressures, waste compactor 10 provides for a minimum waste compaction ratio of 10:1. Although, not shown in the figures, a pressure sensor on the hydraulic fluid line would be used to determine hydraulic pressure and then the pressure exerted by the ram assembly can be readily determined based on the compaction surface.

To ensure a smooth transfer of hydraulic pressure to ram assembly 38, common coupler 45 provides a more uniform transfer of force from the individual hydraulic cylinders 52a-c to the ram assembly 38 to enable smooth travel through the compaction chamber 30. The common coupler 44 decreases the likelihood of more force being applied to one side of the ram assembly 38 by cylinders 52a-c being individually coupled to ram assembly 38. Brackets 60 and braces 62, both depicted in FIG. 2, which are connected to housing 20, FIG. 1, provide resistance to the high forces generated by actuator system 40 as it causes ram assembly 38 to compact waste in waste compaction chamber 30.

Sensors 72a and 72b, FIG. 3A, e.g. spring pot sensors, mounted on ram assembly 38 are used to detect the position of ram assembly 38 as it travels within compression chamber 30. The position information is used by the control system in the compaction and disposal modes as described below with respect to FIGS. 9A-C.

Referring again to FIG. 2, there are a plurality of slots 64a,b and 66a,b in the bottom surface and opposing side surfaces, respectively, of compaction chamber 30. Slots 66b are not visible in FIG. 2. The slots are used to allow liquid extracted from the waste when high pressure is applied to the waste by the ram assembly 38 during the compaction mode to exit compaction chamber 30. The slots may take on other shapes and sizes. They may be formed in one or more internal surfaces of compaction chamber 30. With the design of the preferred embodiment, waste compactor 10 is capable of processing solid waste to have a final liquid waste content of 30%, regardless of the starting liquid waste content of the unprocessed solid waste.

The number, location, and size of apertures in the surface(s) may be selected based on the particular application to achieve the desired amount of liquid removal, while preventing an excessive amount of solid waste material from passing through the apertures. Hydraulic pressure caused by compacting the liquid waste in the compaction chamber must be considered in conjunction with the pressure caused by compacting the solid waste. Too few apertures with a high ram assembly pressure will require additional structural support for the compaction chamber and the overall waste compactor system 10. One skilled in the art will optimize the design based on the required specifications and parameters desired.

Figure 3B:
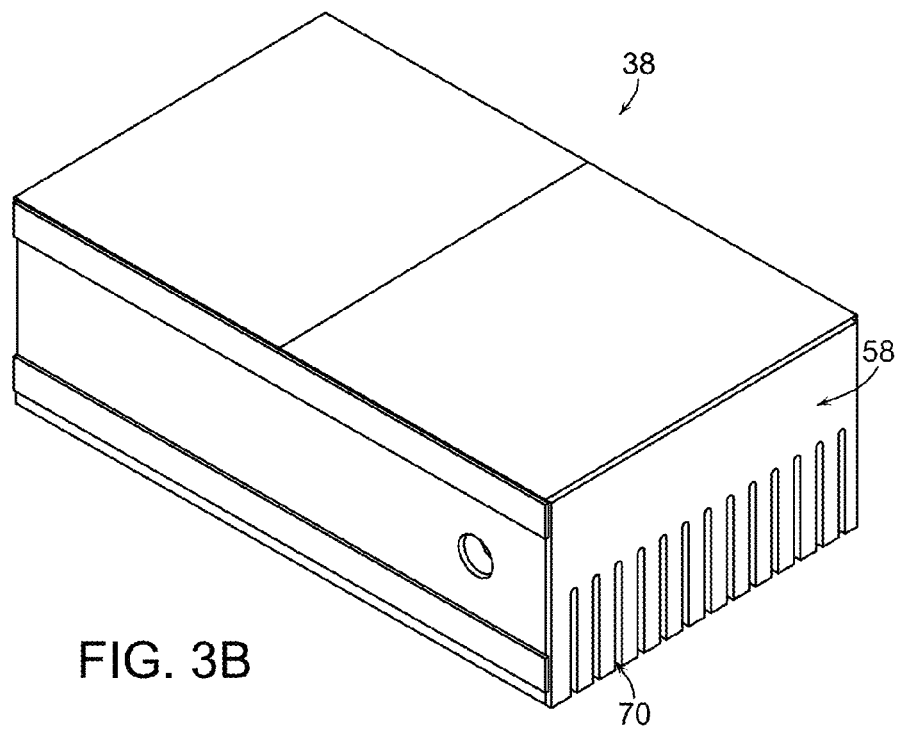
Figure 3C:
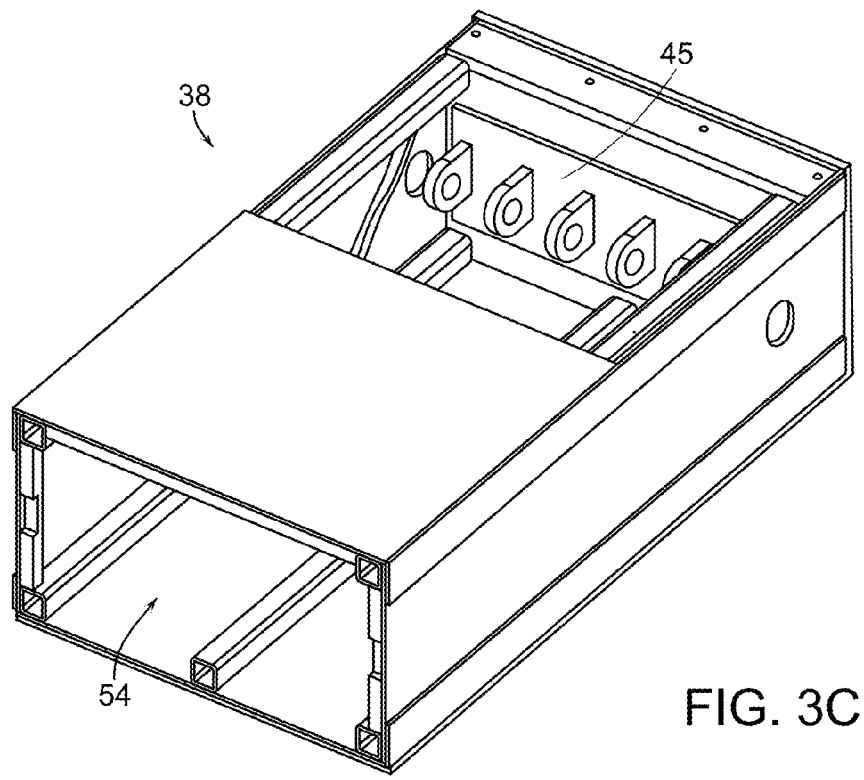

Additionally, channels 70, FIG. 3B, may be included on the compaction surface 58 to facilitate flow of the liquid from the compaction surface 58 to the plurality of slots 64a,b in the bottom surface of the compaction chamber 30.

Figure 4:
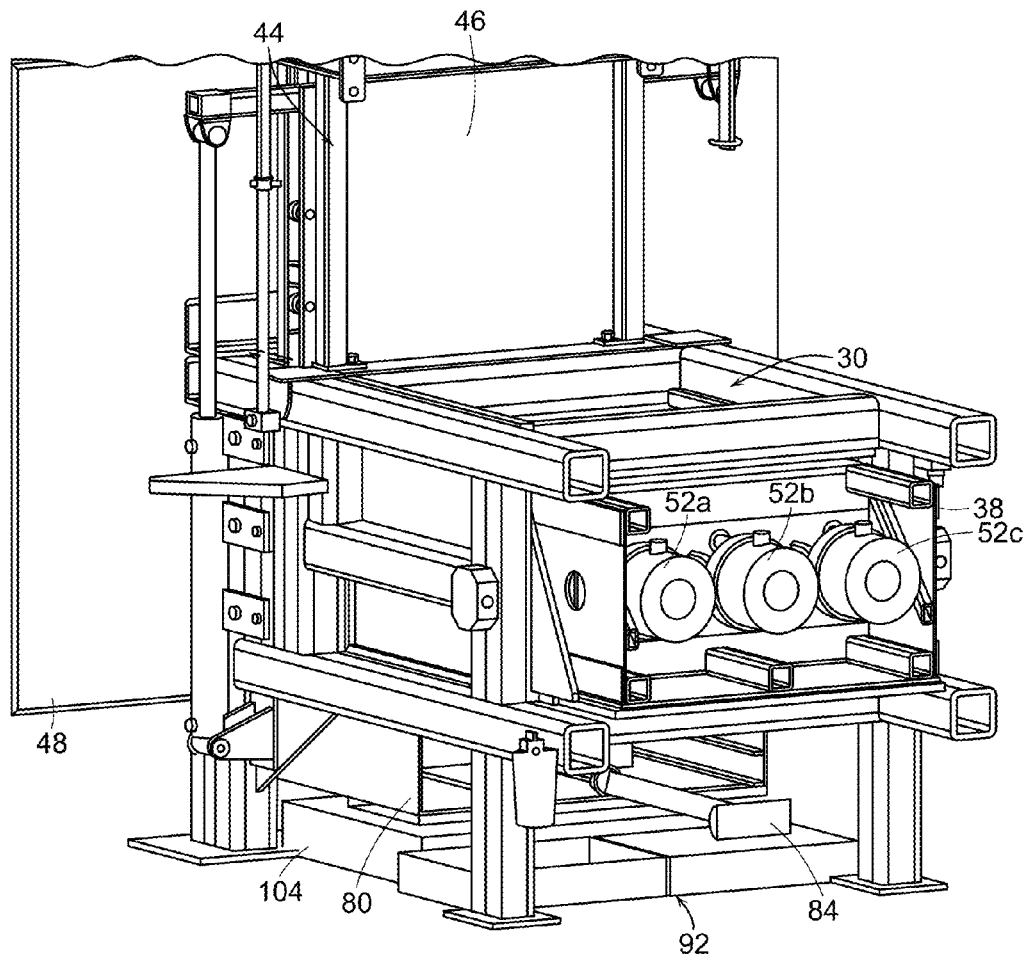
FIG. 4 is a cross sectional view of the waste compactor of FIG. 2 taken across the ram assembly.
Figure 5:
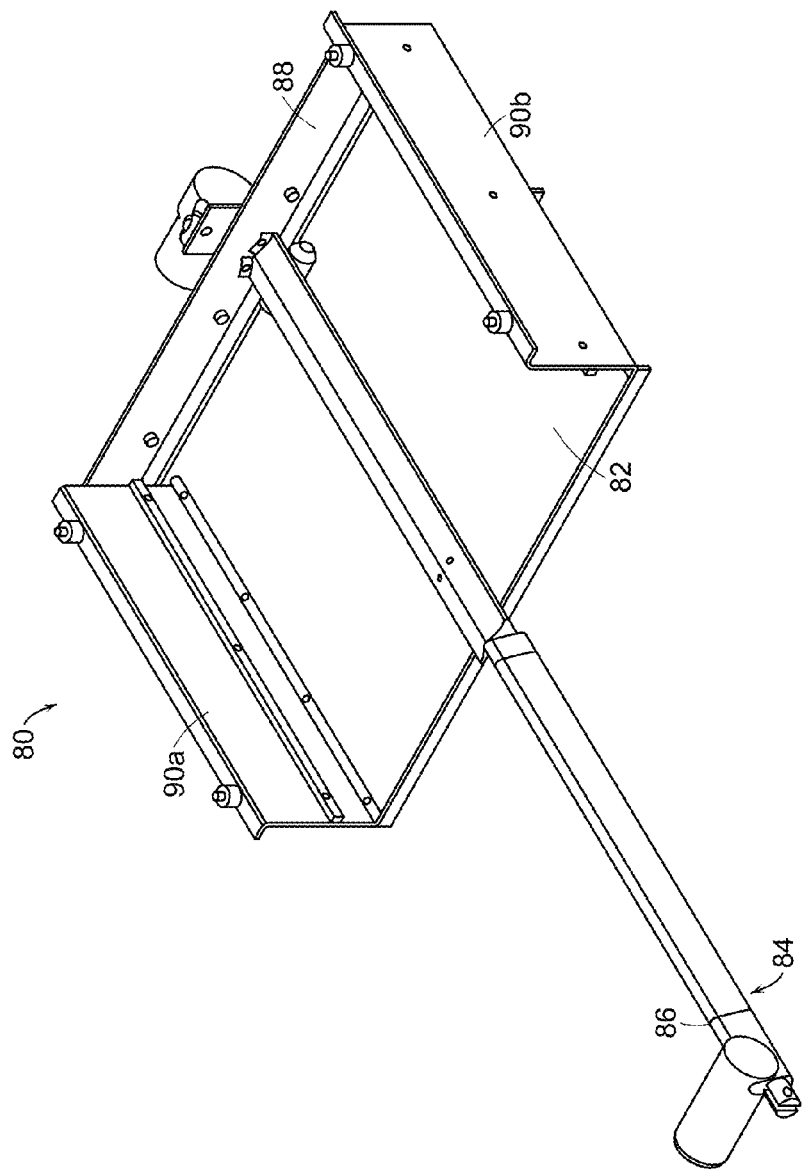
FIG. 5 is a perspective view of the filter unit of the liquid collection system according to this invention.

Liquid from the slots 64a,b and 66a,b exits compaction chamber 30 and enters filter unit 80, FIGS. 4 and 5. The liquid passes through screen filter 82 and captures on its surface solid waste material which passed through slots 64a,b and 66a,b in compaction chamber 30. A mesh that can screen particles 115 microns or larger is suitable. Cleaner system 84 includes a rod 86 and squeegee 88 affixed to an end of rod 86. The cleaner system is periodically activated to cause the rod to retract and pull the squeegee across the surface of filter 82 to remove solid waste and dispose of into container 92, which may comprise a single container or multiple smaller containers. However, the cleaner system is not activated during the movement of the ram assembly in order to contain the solid waste. Container 92 may be periodically emptied as part of routine servicing. Filter unit 80 further includes sidewalls 90a,b to ensure that the solid waste material is contained on the surface of filter 82 when squeegee 88 travels across it and moves the solid waste into container 92.

After the extracted liquid has been filtered by filter unit 80 it then passes to a liquid separation system 101 and on to evaporation systems 102a,b, FIG. 2. The combination of filter unit 80, liquid separation system 101 and evaporation systems 102a,b are collectively referred to as the liquid collection system.

Figure 6:
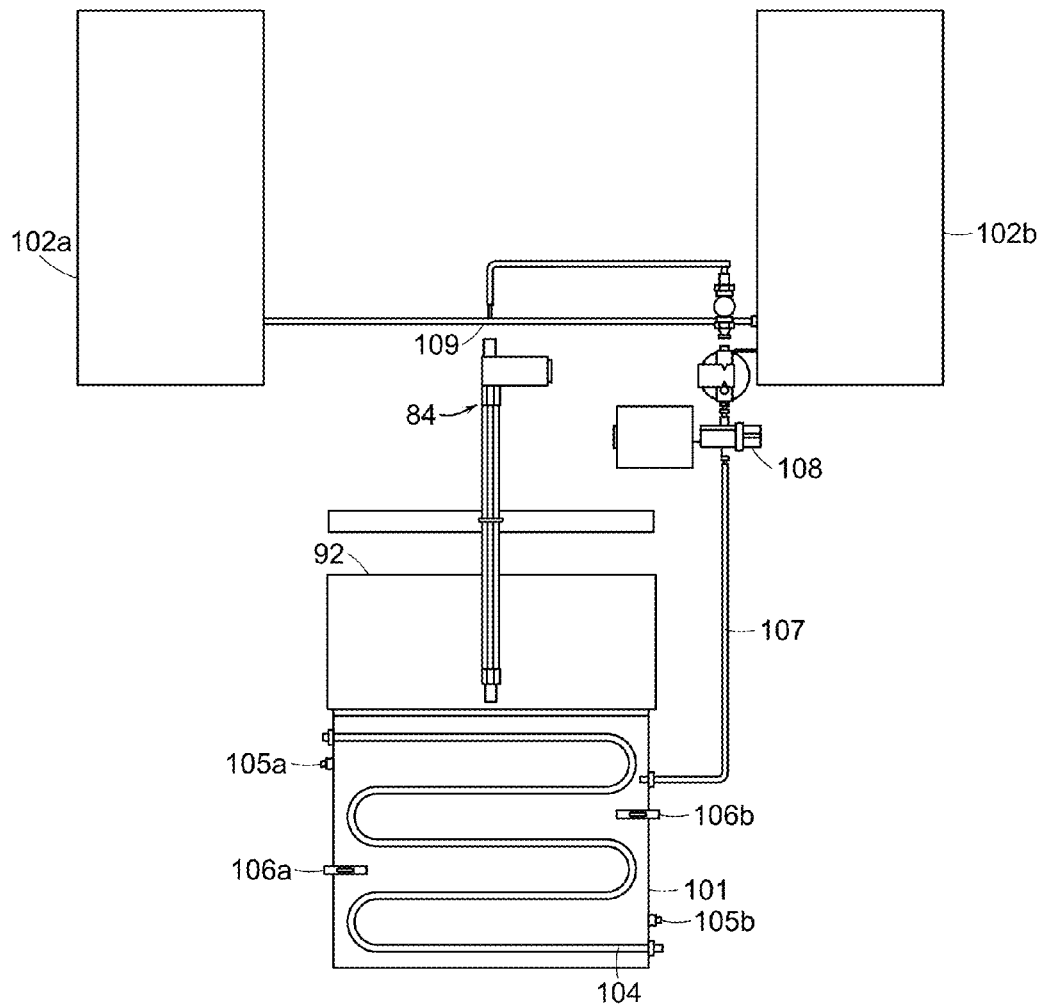
FIG. 6 is a top down view of the liquid separation system of the liquid collection system according to this invention.

Liquid separation system 101 is shown in more detail in FIG. 6 to separate the filtered liquid into two components, a first liquid component having a vapor pressure greater than or equal to the vapor pressure of water and a second liquid component having a vapor pressure less than the vapor pressure of water. The filtered liquid is heated using heating tubes 104 which, in the preferred embodiment, carry hydraulic fluid from the hydraulic system. Conductivity sensors 105a,b and liquid level sensors 106a,b are used for detecting the conductivity and the level (high and low), respectively, of the liquid. Insulated piping 107 is connected to a drain in liquid separation system 101 to remove the first liquid component as it is pumped by pump unit 108 (which includes a filter) to evaporation systems 102a,b via insulated piping 109.

The first liquid component is located on the bottom of the container due to its greater density and pumped until the conductivity sensors 105a,b detect a change in conductivity indicating that the first liquid component has been pumped out of the container and the level of the second liquid component has dropped. Pump 108 to evaporation systems 102a,b are turned off and compaction within compaction chamber 30 is halted. The second liquid component can then be removed via a gravity drain or other suitable means. Subsequently compaction within compaction chamber 30 is reinitiated allowing for liquid collection to begin again until the high level liquid sensor detects the liquid collection container is full. Pump 108 is restarted and pumping of the first liquid component to the evaporation system begins again. The low liquid level sensor may be used to determine when the second liquid component has been removed from the container.

Figure 7B:
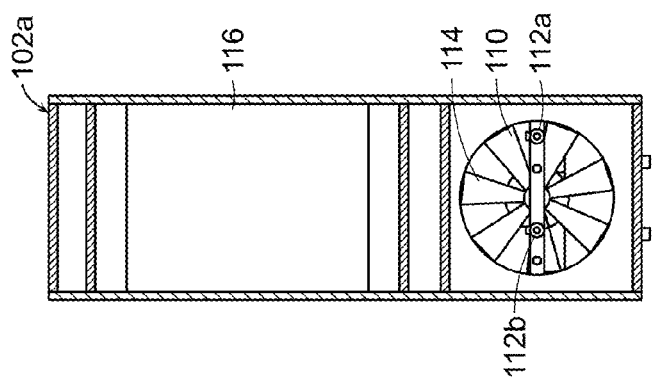
FIG. 7B is a cross sectional view of the evaporation system of FIG. 7A.
Figure 7A:
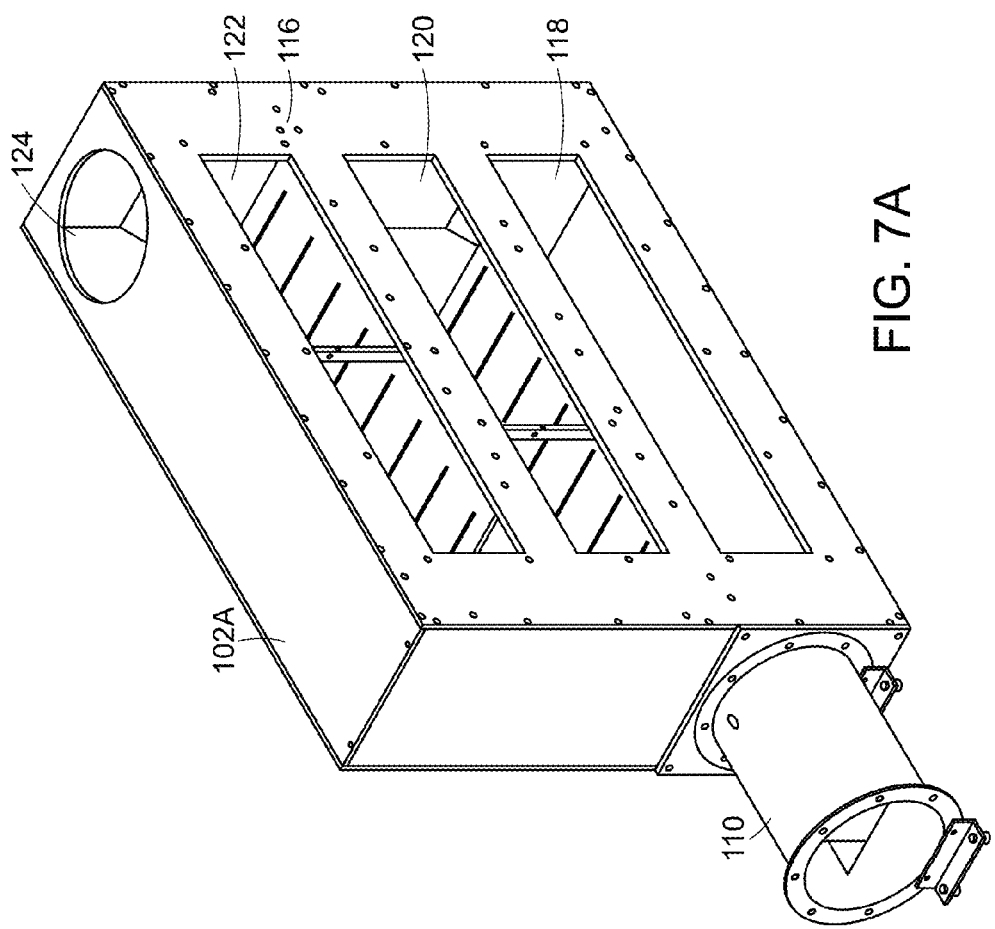
FIG. 7A is a perspective view of the evaporation system of the waste compactor according to this invention.

In FIG. 2 two evaporation systems 102a,b are shown; however, it is not a requirement of this invention and a single evaporation system may be used. In FIGS. 7A and 7B the configuration of a single evaporation system 102a is shown. Evaporation system 102b may have the same configuration.

The first liquid component having a vapor pressure greater than or equal to the vapor pressure of water, is received via tubing 109 (shown in FIG. 6) into input duct 110 and attached to spray nozzles 112a and 112b. Spray nozzles, such as the PJ Fog Nozzle, supplied by Bete Fog Nozzle, Inc. may be used. The spray nozzles should produce a droplet size of no greater than 300 microns and ideally 50-100 microns. While two spray nozzles are shown, any number could be used depending on the application.

Fan 114 is provided proximate the interface between the input duct 110 and the evaporation chamber 116 to entrain the spray of droplets emitted by nozzles 112a,b and carry them in the airflow throughout evaporation chamber sections 118, 120, and 122. In the preferred embodiment, the total length of evaporation chamber 116 is 15 linear feet and the nominal operating flow rate of fan 114 is 500-1,000 cfm with a min/max flow rate of 200/2,000 cfm respectively. Evaporation chamber sections 118, 120, and 122 are folded over on one another to achieve a sufficiently long evaporation chamber while minimizing the footprint of the evaporation system 102*a* and hence the overall waste compactor 10. The airflow is emitted to the atmosphere through outlet 124 at the end of evaporation chamber section 122.

The velocity of the airflow produced by the fan 114 is selected to ensure sufficient retention time in the evaporation chamber 116 to optimize evaporation based on the various conditions. It would be a goal to minimize the length of the evaporation chamber but various factors such as droplet size, liquid temperature, and airflow velocity must be considered for the particular application One or more mist collection pads (not shown) are provided to collect any remaining moisture in the airflow. The mist collection pads may be constructed by, for example, sandwiching a 14" non-woven, polyester filter pad between two plastic plates. The moisture collected is then re-circulated for an additional pass through the evaporation system 102*a*. Additionally, one or more filters may be included at the output 114 to reduce or eliminate environmental impact of the exhausted airflow.

Figure 8:
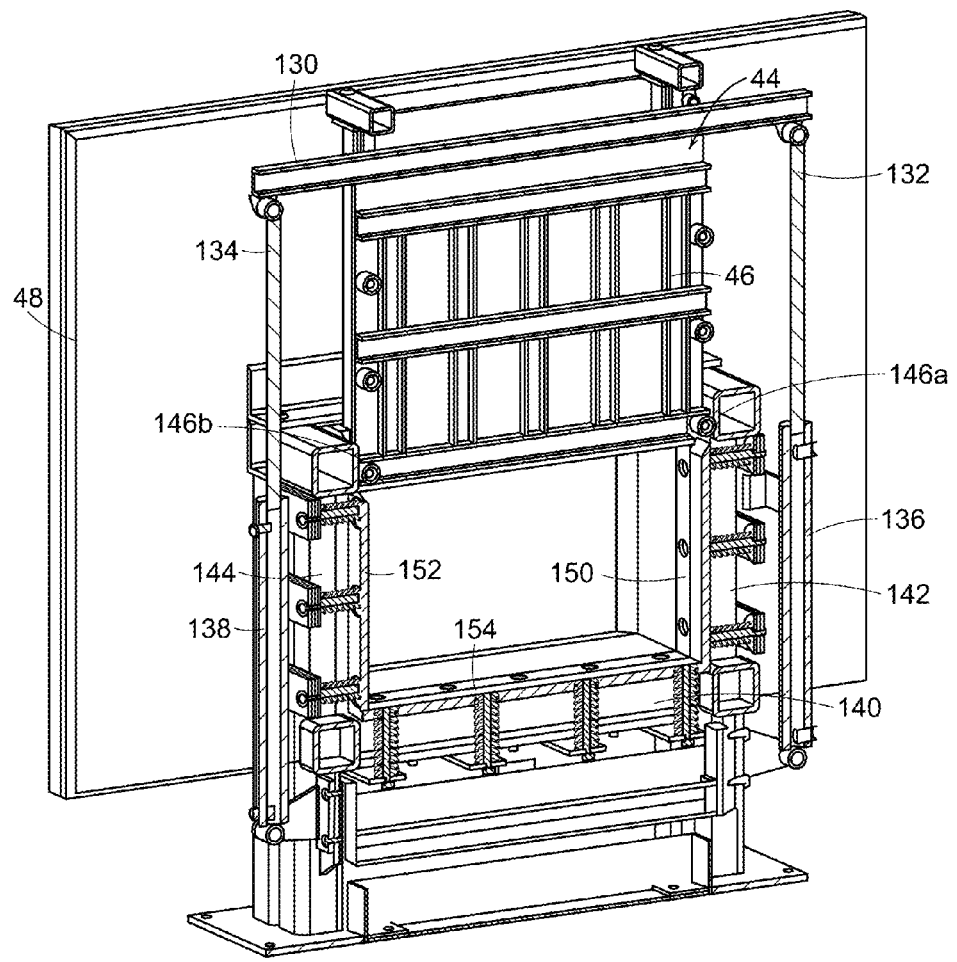
FIG. 8 is a cross sectional view of the closure assembly of the waste compactor according to this invention.

Referring to FIG. 8, closure assembly 44 is shown in more detail. Affixed to interface plate 48, is closure assembly 44, which includes gate 46. Gate 46 is closed when waste is being compacted in the compaction chamber 30 and is opened when the compacted waste units are to be passed into waste container 12. The top of gate 46 is attached to a header 130 which is connected on opposite sides to hydraulic cylinders 132 and 134, which travel up and down within rails 136 and 138, respectively.

Closure assembly 44 includes a bottom spring plate assembly 140 and two side spring plate assemblies 142 and 144. The side spring plate assemblies 142 and 144 are positioned flush with the side edges of gate 46 and as gate 46 is lowered into the closed position, plates 150 and 152 engage with the side edges of gate 46. As the sides of plate 46 engage with plates 150 and 152, the plates are forced in the outward direction and the springs of the of side plate assemblies 142 and 144, respectively, are compressed. The gate 46 may contain rollers, e.g. 146*a* and 146*b*, positioned slightly outward, on the side edges which interface with the plates 150 and 152 of side spring plate assemblies 142 and 144. This not only reduces the friction between the gate surfaces and the side spring plate assemblies with the compaction chamber reducing maintenance but it also properly seals gate 46 during compaction mode preventing the liquid from discharging out the gate. The side spring plate assemblies also ensure that there are no gaps where waste material may become caught during the compaction or disposal of waste as it travels through the compaction chamber 30. Furthermore, the side spring plate assemblies provide mechanical support to the closure assembly more specifically the gate when the waste compactor system is in compaction mode.

Bottom spring plate assembly 140 is positioned in a recess in the bottom surface of the compaction chamber 30 (not shown in FIG. 8). When gate 46 closes and engages with plate 154 of bottom spring plate assembly 140, the springs are compressed and gate 46 travels into the recess below the surface of the compaction chamber 30. This creates a seal between the gate and the bottom surface of the compaction chamber when the gate 46 is in the closed position. As with the side spring plate assemblies 142 and 144, this prevents the liquid from discharging out of the bottom of gate 46 and provides mechanical support to the closure assembly when under pressure. It also ensures that there are no gaps where waste material may become caught during the compaction or disposal of waste as it travels through the compaction chamber 30.

Figure 9A:
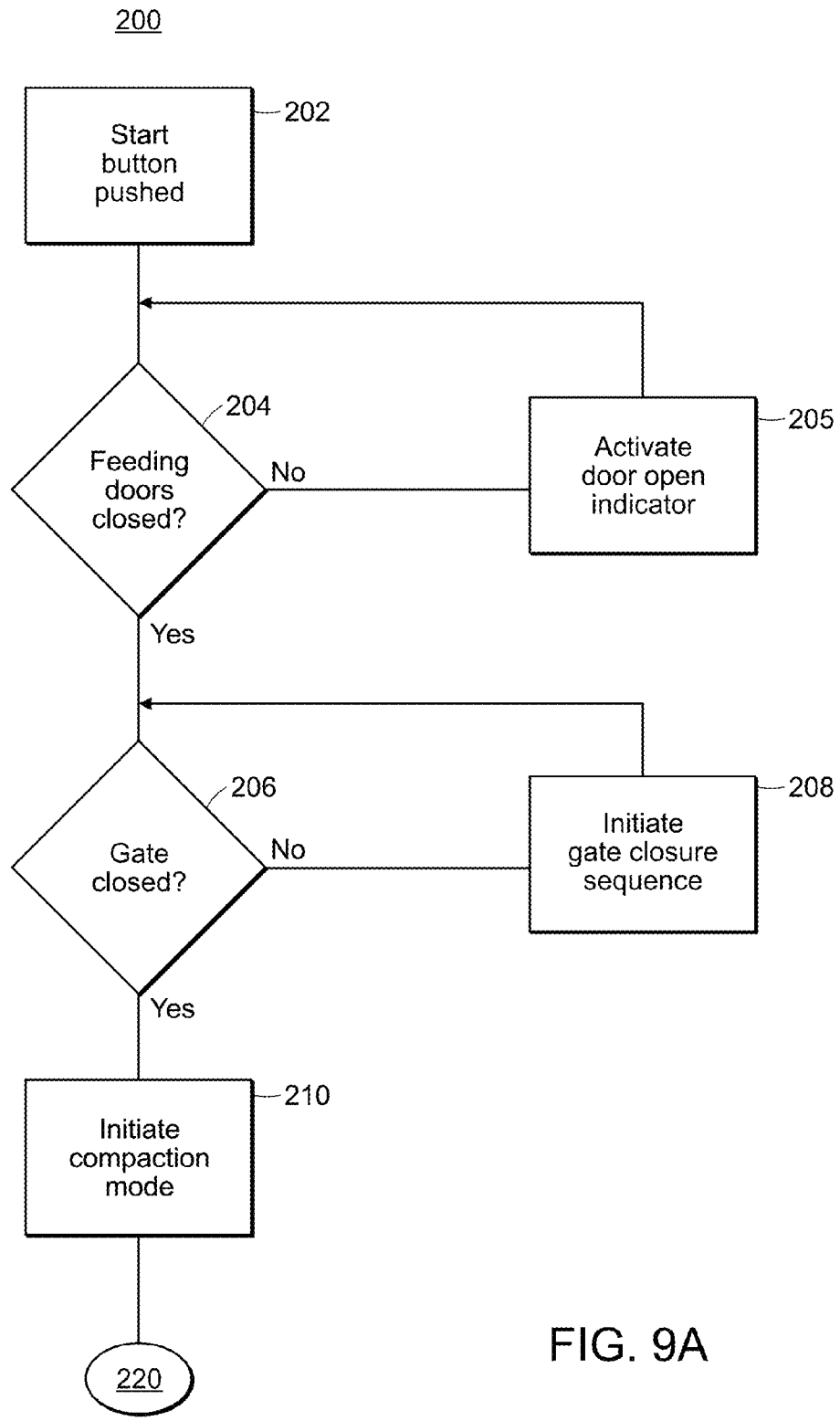
FIG. 9A-C are flow charts depicting the operation of the control system of the waste compactor according to this invention.
Figure 9B:
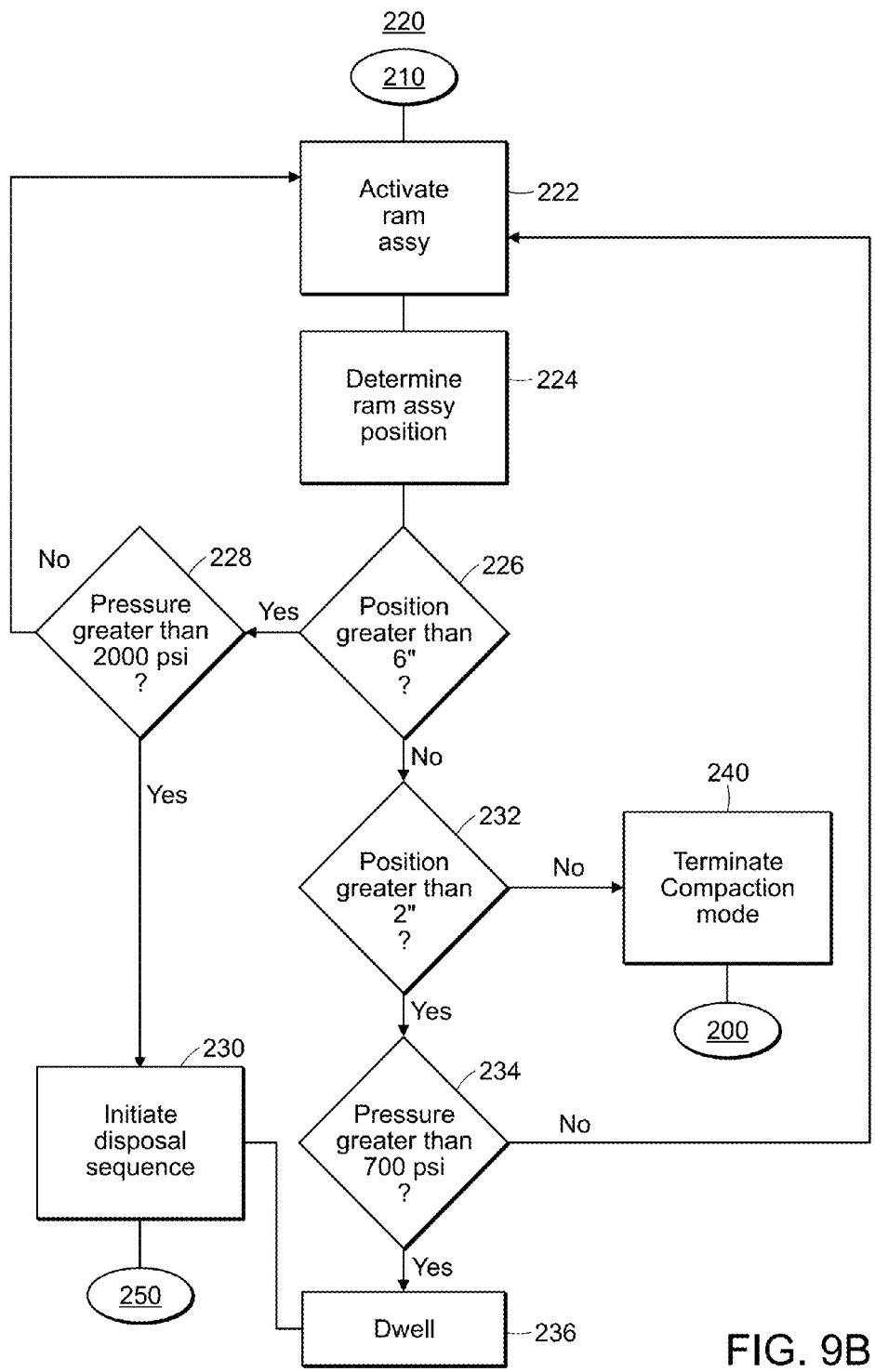
Figure 9C:
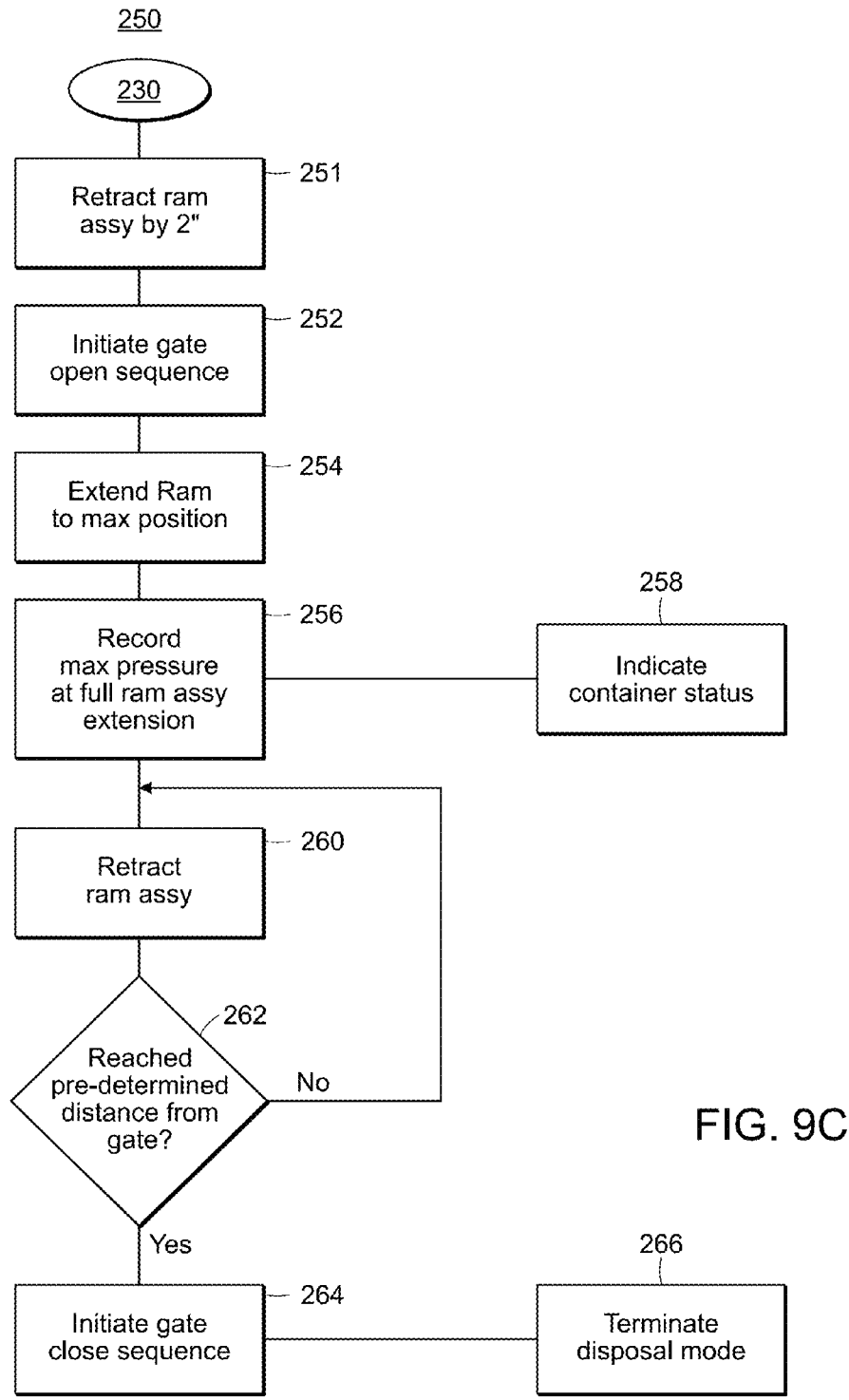

The operation of waste compactor 10 is controlled via a control system which operates according to flow charts depicted in FIGS. 9A-C. In FIG. 9A, flow chart 200 describes the start up sequence. In step 202 an operator activates the start-up of waste compactor 10 by pushing a start button. In step 204, the system queries whether the feeding doors 18*a,b,c*, FIG. 1, are open. If they are, an indicator is activated at step 205 to alert the operator that the feeding doors are open. If the feeding doors are closed, the system proceeds to step 206 to determine if gate 46 of closure assembly 44 is open. If the gate is open, at step 208 a gate closing sequence is initiated and a redetermination is made at step 206 if the gate is closed. Furthermore, if it is determined that the gate is closed at step 206, the compaction mode is initiated at step 210.

The compaction mode sequence is described in flow chart 220, FIG. 9B. At step 222 ram assembly 38 is activated to begin forward movement to compact waste in the compaction chamber 30. At step 224 the position of ram assembly 38 is determined using data provided by position sensors 72*a* and 72*b*, FIG. 3A. At step 226, it is determined if ram assembly 38 has at least reached the start of the ideal compaction zone within the compaction chamber, which is defined as a zone between +2 inches from gate 46, FIGS. 2, and +6 inches from gate 46. The distances used herein are simply for describing a preferred embodiment and are in no way limiting. The location of the ideal compaction zone may be varied depending on the application. The specific query at step 226 is whether the position of the ram assembly 38 is greater than +6 inches from gate 46. If the position is greater than +6 inches, this indicates that ram assembly 38 has not yet reached the ideal compaction zone.

If the distance is greater than +6 inches the hydraulic cylinder pressure is then checked to determine if it exceeds a pre-determined pressure level at step 228. In the preferred embodiment, the level is 2000 psi of hydraulic pressure, which translates into approximately 380 psi of pressure on compaction surface 58 of ram assembly 38. The pressure level may be varied depending on the application.

If this pressure level has been exceeded, this indicates that a substantially non-compressible object is located in the compaction chamber impeding forward motion of ram assembly 38. Therefore, the compaction mode is terminated when at step 230 the disposal sequence is initiated in order to remove the non-compressible object from the waste compactor 10 and dispose of it in the waste container 12. Alternatively, if the pressure at step 228 does not exceed the predetermined level, the compaction mode and forward movement of ram assembly 38 continues and the system cycles back to step 222.

If at step 226 the position of the ram assembly 38 is determined to be less than +6 inches from gate 46, this indicates that ram assembly 38 is either in the ideal compaction zone (+2 inches to +6 inches from gate 46) or it has passed the ideal compaction zone (+0 inches to +2 inches from gate 46). Furthermore, if it is determined in step 232 that the ram assembly 38 is greater than +2 inches from gate 46, then the hydraulic cylinder pressure is checked at step 234 to determine if the pressure exceeds another, lower pre-determined pressure level. In the preferred embodiment, this pressure level is 700 psi of hydraulic pressure which translates to approximately 130 psi of pressure on the compaction surface 58 of ram assembly 38.

If the pressure level exceeds 700 psi at step 234, the system has thus detected that a desired pressure level, 700 psi of hydraulic pressure/130 psi of ram compaction pressure, has been achieved in the ideal compaction zone, indicating the formation of the desired size of a compacted waste unit for this preferred embodiment. As a result, at step 236 forward motion of the ram assembly 38 is stalled by the waste block within the compaction chamber and the pressure is held by the ram assembly for a short dwell time, e.g. 30 seconds, until the disposal sequence is initiated as set forth in FIG. 9C. By initiating the disposal sequence the compacted waste unit will be disposed of in the waste container 12.

If instead, at step 232 it is determined that the current ram assembly position is not greater than +2 inches from the gate, indicating it has passed the ideal compaction zone, then at step 240 the compaction mode is terminated and the ram assembly is fully retracted. The system waits for an operator to initiate a new start up sequence, pursuant to FIG. 9A, after more waste material has been loaded into the compaction chamber. This approach is taken to avoid transferring the compacted waste material into the waste container 12 before a desired size waste unit has been formed. Alternatively, instead of terminating the compaction mode at step 240, the system may be configured to automatically cycle through the compaction mode one or more additional times in the event there is additional waste to be compacted in the compaction chamber.

If, at step 234, it is determined that the pressure level does not exceed 700 psi, the compaction mode and forward movement of ram assembly 38 continues and the system cycles back to step 222.

In FIG. 9C, the disposal sequence is depicted in flow chart 250. At step 251 ram assembly 38 is backed away 2 inches from gate 46 in order to relieve the pressure off the gate when it is opened. The distances used herein are simply for describing a preferred embodiment and are in no way limiting. In step 252 gate 46 of closure assembly 44 is opened. At step 254, the ram assembly is extended to its maximum position to move the waste from the compaction chamber 30 into the waste container 12. The maximum pressure on surface 58 of ram assembly 38 is determined at step 256 and at step 258 the status of the waste container 12 is determined. A light indicator (not depicted) communicates to the operator the remaining capacity of the waste container. At step 260 the ram assembly is retracted and at step 262 it is determined if the ram assembly has reached a predetermined distance from gate 46, at which time at step 264 the gate 46 is closed. At step 266 the disposal sequence is terminated. The system waits for an operator to initiate a new start up sequence, pursuant to FIG. 9A.

Figure 10:
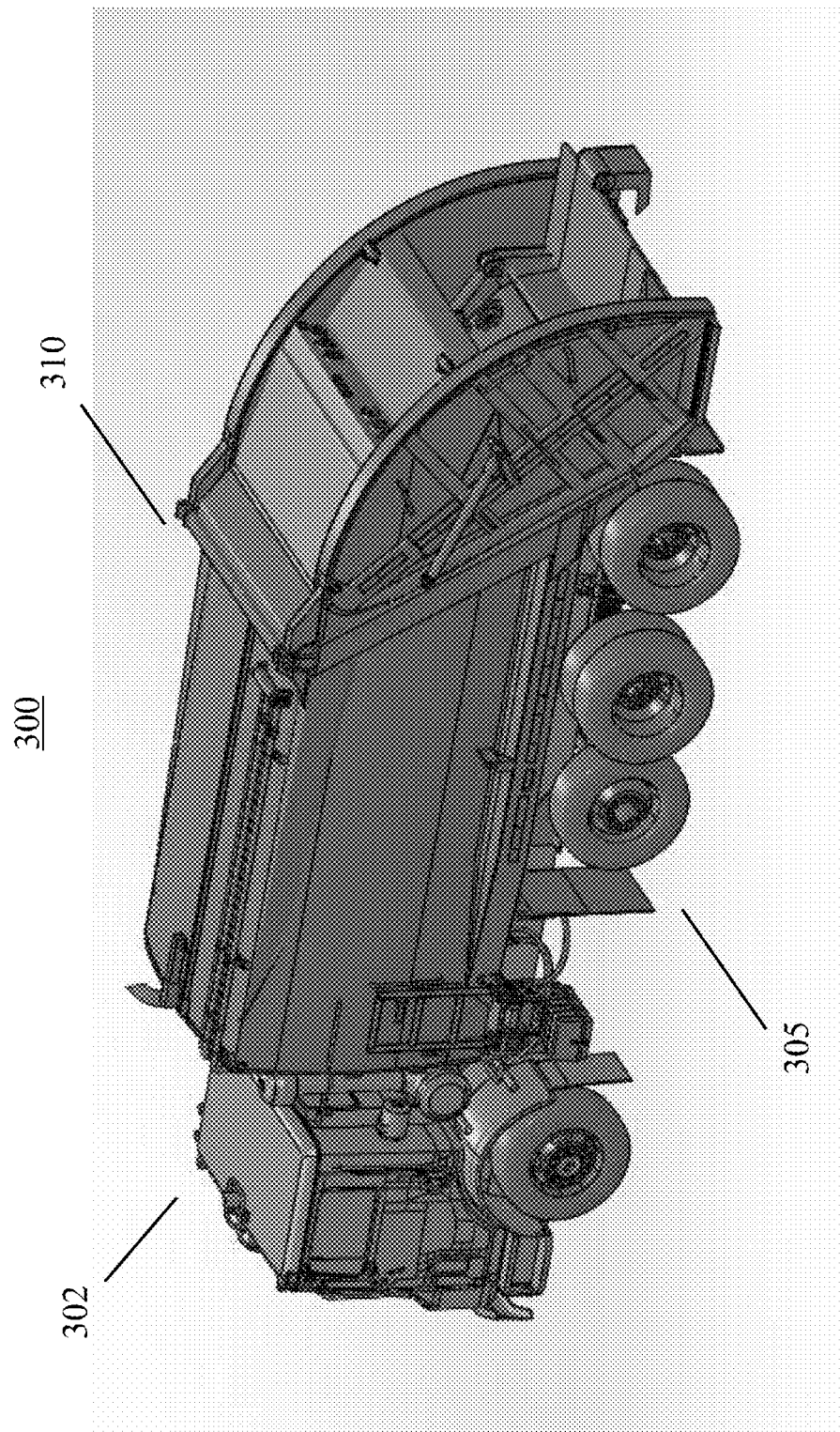
FIG. 10 is a perspective view of a waste compaction vehicle including a waste compactor system according to another embodiment of this invention.

The above waste compactor system is described as a stationary unit; however, the concepts of the invention may also be incorporated into a mobile system, such as a waste compactor vehicle. Thus, according to another embodiment of the invention, a vehicle 300, FIG. 10, for collecting and compacting waste for disposal is shown. The vehicle 300 can be any vehicle equipped with a crew cab 302 for a driver to operate the vehicle 300, and a vehicle frame 305. A compaction system 310 is mounted on the vehicle frame 305, and is configured to compact the waste for disposal and collect and evaporate the liquid from the compaction of the waste. In this example, the vehicle 300 is loaded with waste to be compacted from the rear, but this invention may be applied to top or side loading vehicles as well.

Figure 11:
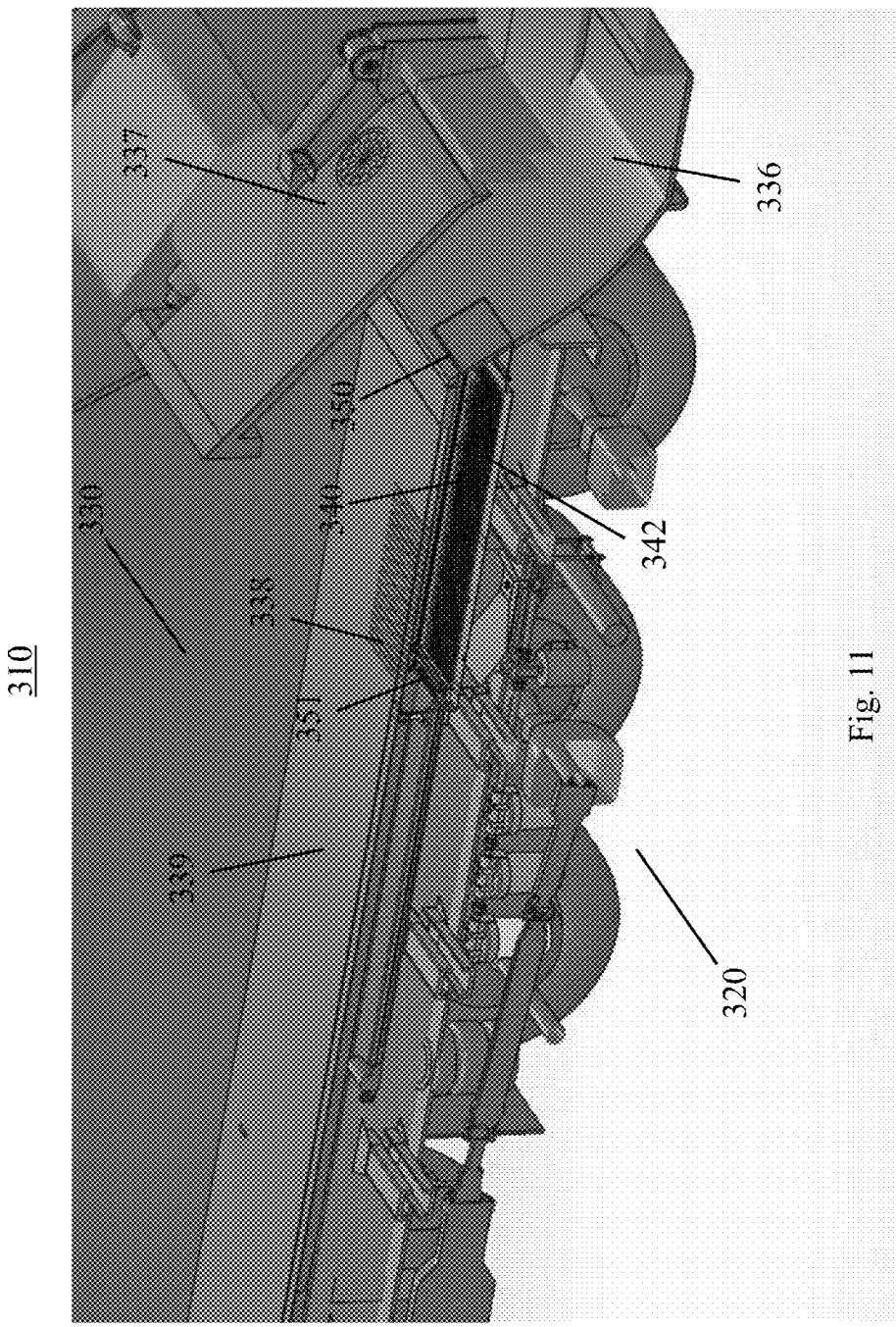
FIG. 11 is a perspective view of the compaction system of this invention integrated into the waste compaction vehicle.

A shown in FIG. 11, the compaction system 310 includes a compaction chamber 330 where waste collected is compacted in a conventional manner. A liquid collection system 320 is included according to this invention which may be integrated into the compaction vehicle 300. The compaction chamber 330 includes a loading region 336, which is part of a loading unit 337, into which waste to be compacted is inserted by one or more operators. When full, an operator activates the loading unit 337 to transfer (via a hydraulic system) the waste in loading region 336 to another region of compaction chamber 330 proximate a plurality of apertures 338 disposed on the bottom internal surface 339 where the waste is compacted. Compactor system 310 applies pressure to the waste in the compaction chamber 330 to reduce a volume of the waste during compaction. The apertures 338 can be configured in various sizes and shapes to allow the passage of the maximum amount of liquid from the waste as it is compacted while minimizing the passage of residual solid waste through the apertures. In this example, the apertures 338 are slots having a length of 24 inch and a width of 1/16 inch. In other embodiments, the apertures 338 can have slots with a width ranging from 1/4 inch to 1/32 inch. There could alternatively be a plurality of circular apertures having diameters raging from 1/16 inch to 3/8 inch.

Filter unit 340 located immediately below compaction chamber 330 is configured to receive the liquid and residual solid waste exiting compaction chamber 330 through apertures 338. Filter unit 340 may be located in other places in compaction system 310 in which case the liquid and residual waste would be pumped thereto. Filter unit 340 separates the liquid and residual solid with a filter 342. The residual solid waste captured by filter 342 may be cycled back to the compaction chamber 330 through opening 350 by a scraper device 351. Opening 350 is in communication with loading region 336 of compaction chamber 330. This operation will be described in more detail below.

Figure 12:
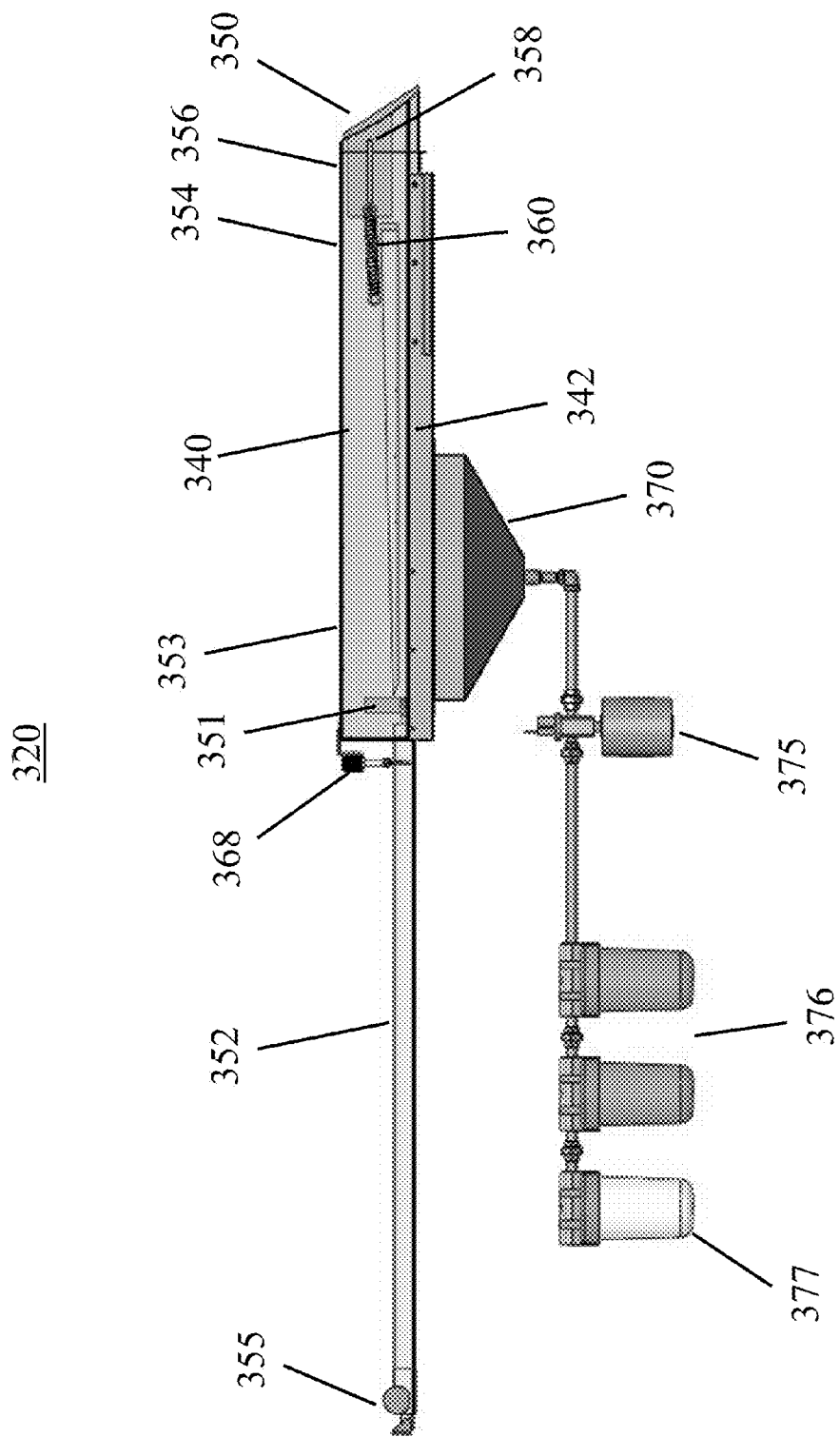
FIG. 12 is a cross sectional view of the liquid collection system of the waste compaction system of FIG. 10.

In FIG. 12 liquid collection system 320 is shown in more detail. Disposed on the bottom internal surface of filter unit 340 is filter 342 which is configured to allow only the liquid to pass through, leaving the residual solid waste on the top surface of filter 342. Thus, upon entering of the filter unit 340, the liquid and the residual solid waste are further separated by the filter 342. The design of the filter 342 can vary in order to allow the separation. In this example, the filter 342 can include a filter material 343 (visible in FIGS. 13A-B). The filter material has a plurality of openings with a mesh size of 24×24. The filter material uses wire that is 0.0075 inch in diameter and with an opening size ranging from 0.01 inch to 0.05 inch (preferably from 0.012 inch to 0.047 inch). In this example, opening size is 0.034 inch. The filter 342 can further include a perforated plate 345 (visible in FIG. 14) to support the bottom of the filter material 343, the perforated plate having a plurality of holes with a width of 1/4 inch. In other embodiments, the width of the holes can also vary (e.g., ranging from 1/2 inch to 1/8 inch).

Filter unit 340 also includes the scraper device 351 interconnected to a first actuator 352. The scraper device 351 travels from a first end 353 to a second end 354 of the filter unit 340 across the top surface of the filter 342 in an extension mode. The scraper device 351 travels from the second end 354 to the first end 353 in a retraction mode. The scraper device 351 can be driven by any suitable power resource. For example, the scraper device 351 is driven by a motor 355.

The filter unit 340 can further include a closure assembly 356 to seal the opening 350 in the second end 354 to allow residual solids captured by filter 342 to be cycled back to the compaction chamber 330 through opening 350 by scraper device 351. The closure assembly 356 is configured to open upon the extension of the scraper device 351, and close upon the retraction of the scraper device 351. Any mechanism of the opening and closing of the closure assembly is within the scope of the invention. For example, shown in FIG. 12, the closure assembly 356 includes a door 358 and one or more springs 360 affixed to the door 358 to bias the door 358 in a closed position. The scraper device 351 opens the door 358 as it is forced against the door when it moves to the extended position in the extension mode and the door 358 closes due to the spring bias as the scraper devices 351 moves toward the retracted position in the retraction mode. In other embodiments, the closure assembly 356 may include a motion sensing unit that opens the door 358 based on a detection of the extension of the scraper device 351, and closes the door 358 based on a detection of the retraction of the scraper device 351.

Figure 13A:
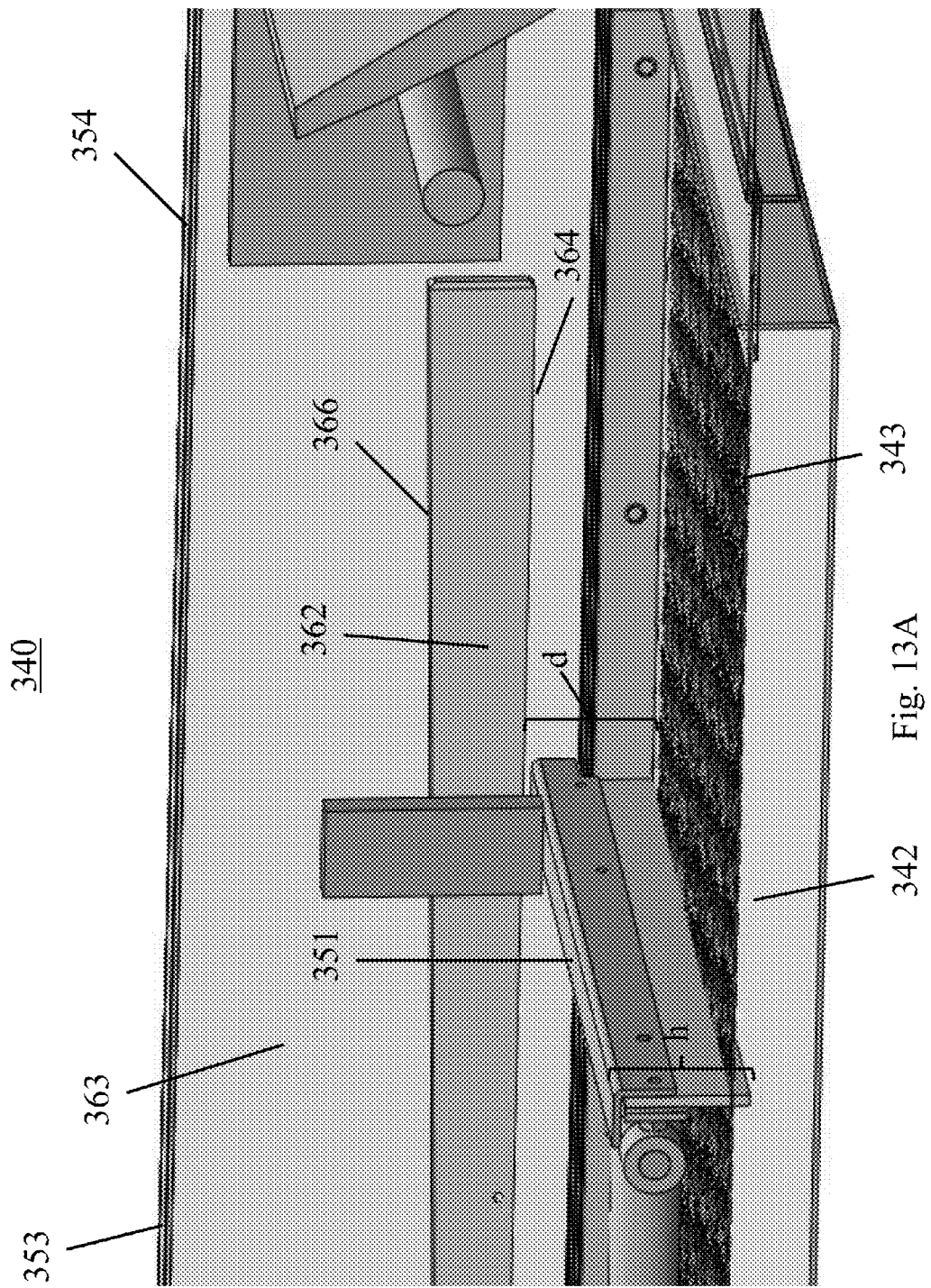
FIG. 13A-B are perspective views of extension mode and retraction mode of the filter unit of the waste compaction system of FIG. 10.
Figure 13B:
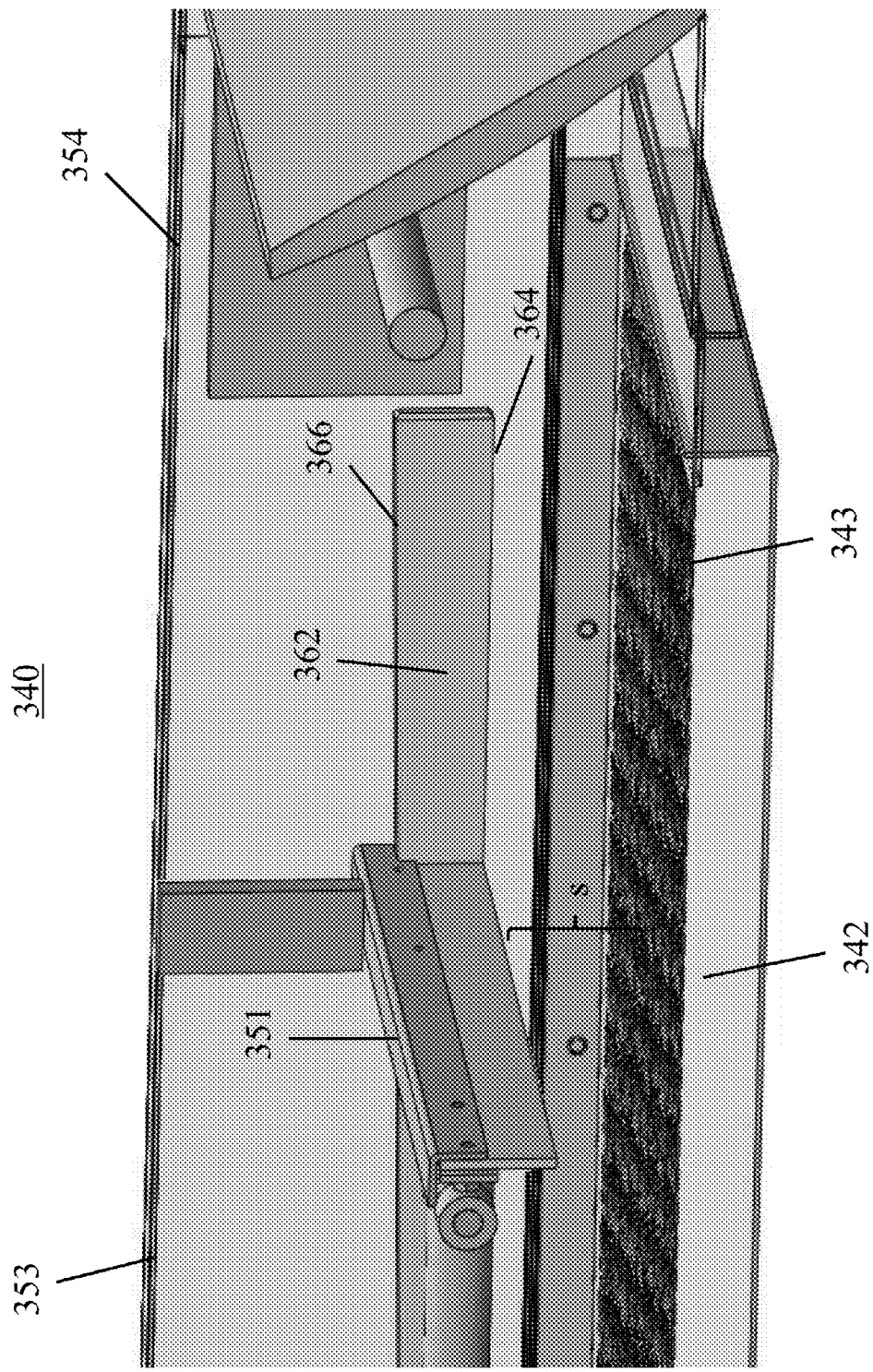

FIGS. 13A-B further illustrate the operation of scraper device 351 in the extension and retraction modes. Guide members 362 (only one is shown in this view) are disposed on two opposite internal surfaces 363 of the filter unit 340 and extending from proximate the first end 353 to proximate the second end 354 of the filter unit 340. In the extension mode, FIG. 13A, the scraper device 351 travels under the bottom surfaces 364 of the guide members 362 to maintain contact between the scraper device 351 and the filter 342. The distance, d, between the bottom surface 364 of guide members 362 and filter 342 may be equal to or less than the height, h, of scraper device 351 to ensure there is contact with and positive pressure exerted on the surface of filter 342 by scraper device. As a result, the scraper device 351 removes the residual solid waste remaining on the on the top surface of the filter 342, and forces the residual solid waste out of the filter unit 340 through the opening 350.

In retraction mode, FIG. 13B, the scraper device 351 is in contact with the top surfaces 366 of the guide members 362 as the scraper device 351 moves from the extended position to the retracted position to maintain separation, s, between the scraper device 351 and the filter 342. Upon retraction of scraper device 351, a second actuator 368 (FIG. 12), moves the scraper device 351 up and away from the top surface of the filter 342. As scraper device 351 is being retracted and moved up it is positioned on the top surfaces 366 of the guide members 362 as the scraper device 351 moves from the second end 354 to the first end 353 of the filter unit 340 in the retraction mode. This is done to ensure that any remaining residual solid waste on the filter 342 is not forced back toward the first end of the filter unit 340. The second actuator 368 can be driven by any suitable power resource. For example, the second actuator 368 can be driven by a motor. The top surfaces 366 of guide members 362 may be angled downward from the second end of filter unit 340 toward the first end so that the separation, s, between scraper device 351 and the surface of filter 342 decreases as the scraper device moves toward the first end. Once in the fully retracted position the scraper device comes off of the guide members 366 and is positioned on the surface of filter 342 by the second actuator 368.

FIG. 14 further illustrates the opening mechanisms of the closure assembly 356. The closure assembly 356 may be configured so that the scraper device 351 is in contact with the door 358 upon extension, and forces the door 358 to open from the biased closed position of the door 358 by the spring 360 (shown in FIG. 12). Door 358 includes side panels 359a,b which travel in tracks 361a and 361b (not visible in this view). Scraper device 351 includes vertical blocks 363a and 363b (not visible in this view) which impact dowel 365 to force door 358 open. The residual solid waste removed from the filter 342 by the scraper device 351 can then be forced out of the filter unit through the opening 350. As the scraper device 351 is retracted, springs 360 cause the door 358 to move in the direction of travel of the scraper device 351 until vertical blocks 363a,b lose contact with dowel 365 and door 358 seals opening 350.

Figure 15:
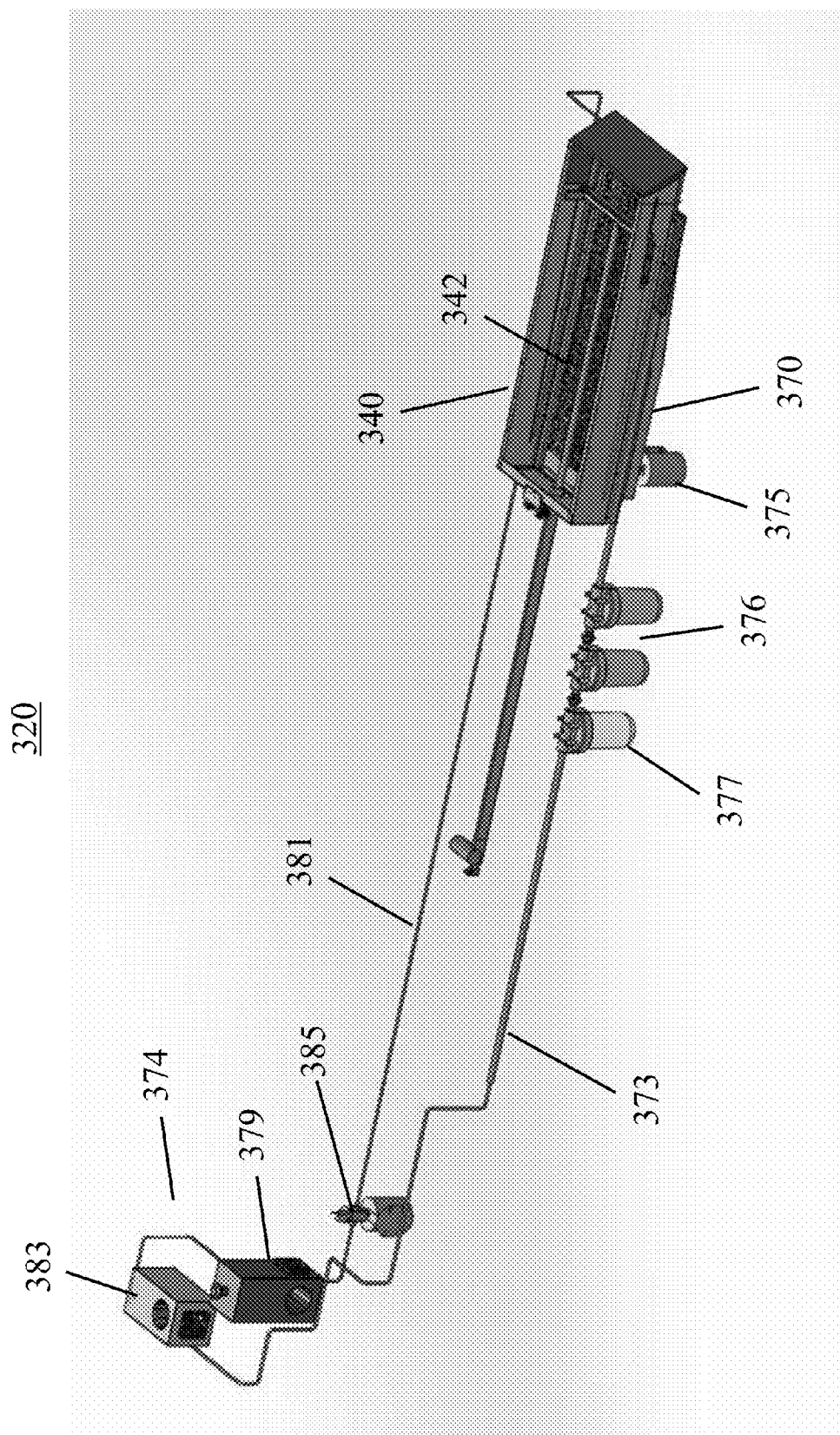
FIG. 15 is a perspective view of the liquid collection system of the waste compaction system of FIG. 10.

As shown in FIGS. 12 and 15, the liquid collection system 320 further includes a liquid collection chamber 370 configured to receive the liquid exiting from the filter unit 340 through the filter 342. The liquid collection chamber 370 can be disposed in various positions of the vehicle 300. For example, shown in FIGS. 12 and 15, the liquid collection chamber 370 can be mounted on the bottom of the filter unit 340. Various shapes of the liquid collection chamber 370 are also within the scope of the invention. For example, the liquid collection chamber 370 can be cubic, cylindrical or conical.

A line 373 (FIG. 15) may be included in the liquid collection system 320 to transport the liquid from the liquid collection chamber 370 to an evaporation system 374. The liquid may be transported, for example, by a pump 375, from the collection chamber 370 to evaporation system 374. The liquid collection system 320 may also include one or more filtration units. For example, a filtration unit 376 may be configured to remove particles from the liquid. In some embodiments, the size of the particles removed by the filtration unit 376 can range from 0.5 to 5 microns. A second filtration unit 377 may also be included in the liquid collection system 320 to remove hydrocarbon and odor from the liquid. The material used in the second filtration unit 377 may, for example, be activated carbon.

Figure 16A:
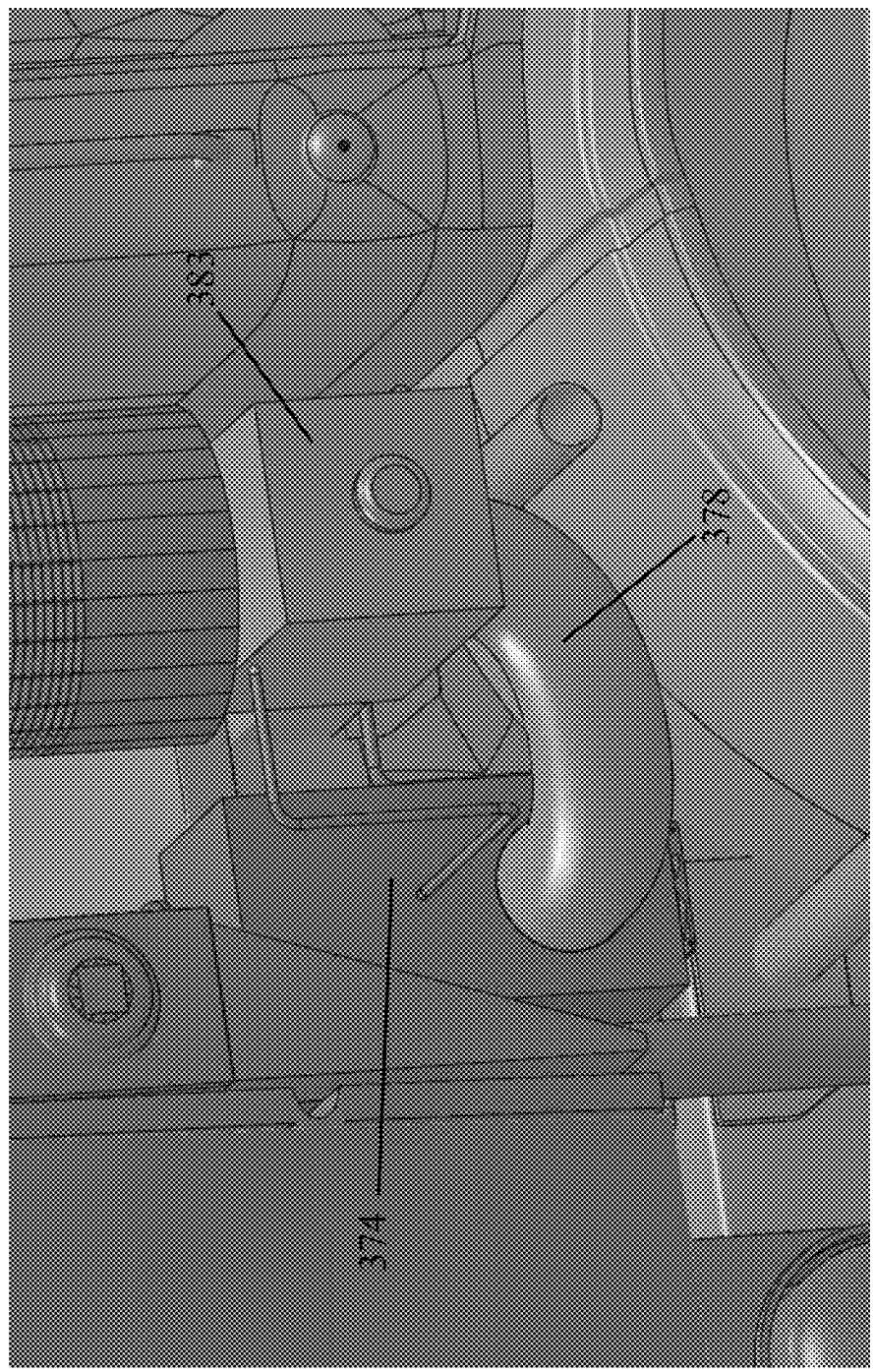
FIG. 16A-C are perspective views of the evaporation system of the waste compaction system of FIG. 10.
Figure 16B:
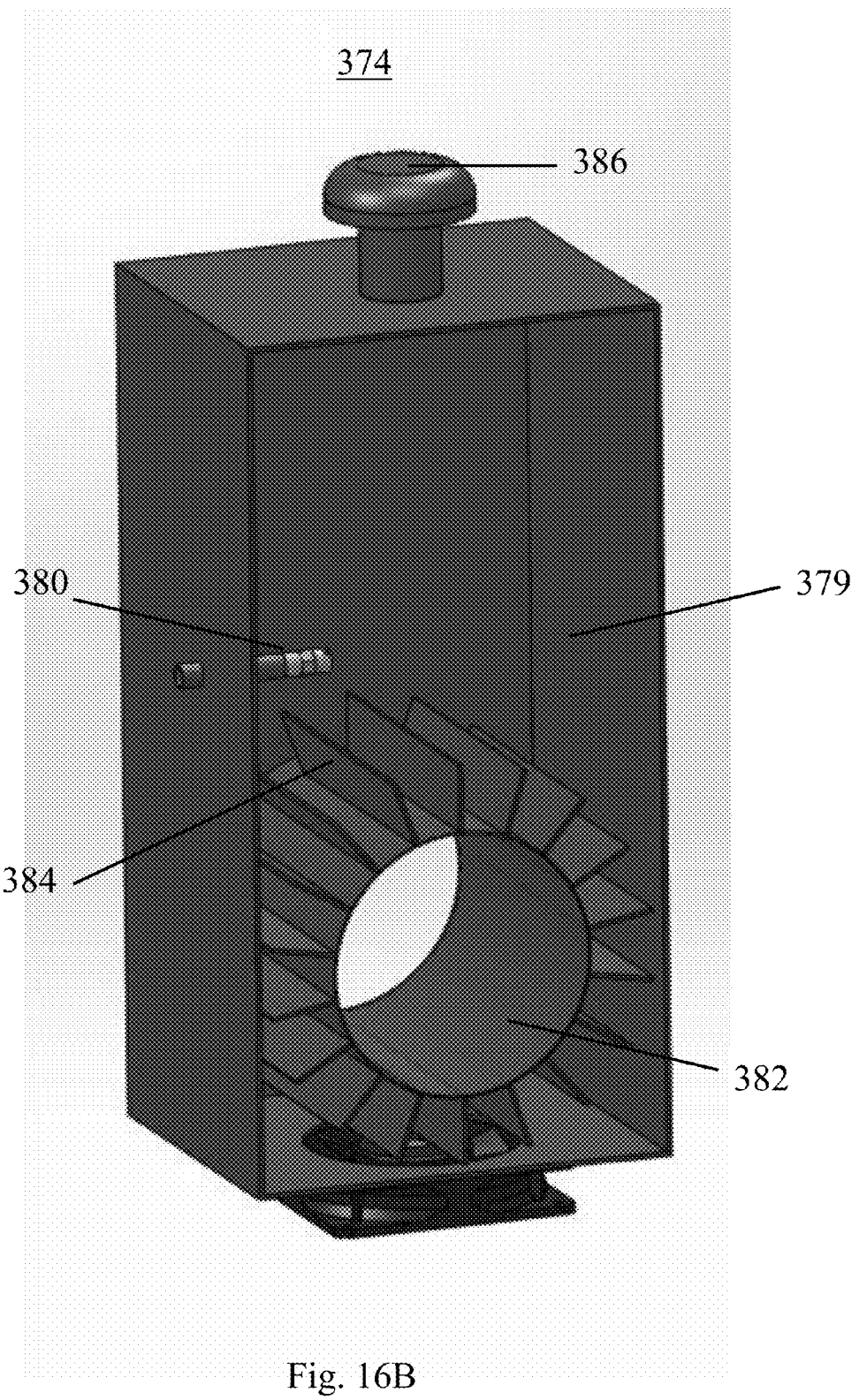

FIG. 16A further shows another perspective of a portion of vehicle 300. The evaporation system 374 is mounted on the vehicle 300 and uses the exhaust gas from the exhaust pipe 378 of the vehicle 300 as a heating resource. The evaporation system 374, FIG. 16B, includes an evaporation chamber 379, in which the liquid is evaporated. A nozzle 380 can be disposed on one internal surface of the evaporation chamber 379, and configured to spray the liquid transported by the line 373 into the evaporation chamber 379. The nozzle can be any type of nozzle described above in earlier embodiments according to this invention. The evaporation system 374 also includes a first heater 382, configured to heat and evaporate the spray. The first heater 382 can be configured to heat the spray to a temperature above 32 degrees F. to cause the spray to evaporate in the evaporation chamber 379. In this example, the first heater 382 heats the spray to approximately 140 degrees F. Evaporation system 374, FIGS. 15 and 16A, may further include a second heater 383 to heat the liquid prior to the liquid flowing through the nozzle 380. Any heating resource used by the first and the second heaters is within the scope of the invention. In this example, the exhaust gas of the vehicle 300 is to be used as the heating resource. Additionally, multiple fins 384 may be disposed in the evaporation chamber 379 to increase the surface area of the heater 382 in order to better facilitate the evaporation of the liquid. The evaporation system 374 also includes an opening 386 on an internal surface of the evaporation chamber 379, through which the gas formed by the evaporation of the liquid exits the evaporation chamber 379.

Figure 16C:
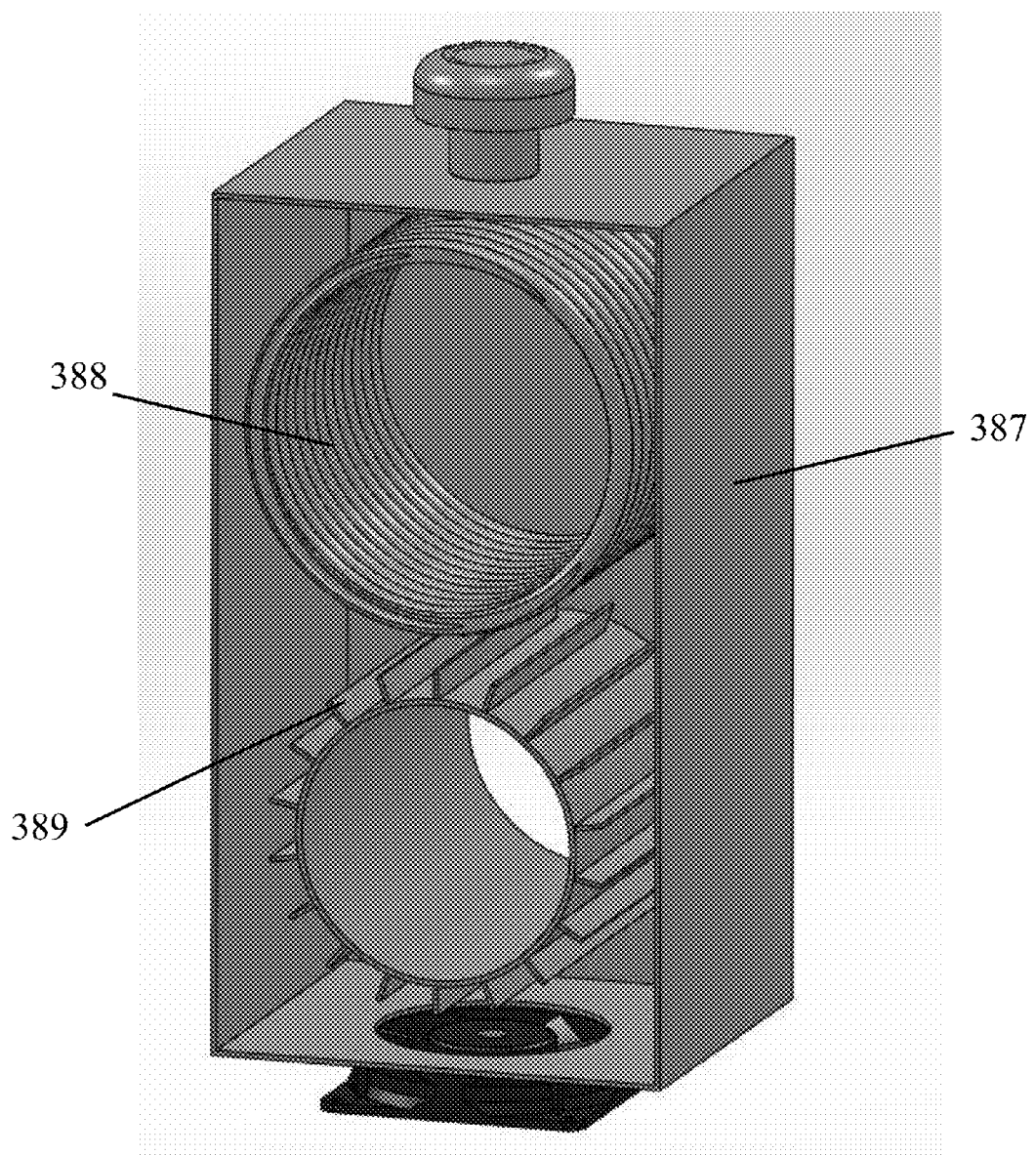

Illustrated in FIG. 16C, the second heater 383 may include a heating chamber 387 configured to heat the liquid to a temperature above 32 degrees F. The second heater 383 may also include a coiled line 388 in which the liquid to be heated passes through the heating chamber 387. Additionally, multiple fins 389 may be disposed in the heating chamber 387 to increase the internal surface area of the heating chamber 387. In this example, the heat received from the exhaust gas passing through second heater 383 of the vehicle 300 is transferred by the fins 389 to create heated air in the heating chamber 387, and heat the coiled line 388 and the liquid therein. The temperature to which the liquid was heated may be determined by the retention time of the liquid through the coiled line 388.

Referring again to FIG. 15, in some embodiments, a second line 381 may be included in the liquid collection system 320 to transport un-evaporated liquid (e.g., oil) from the evaporation system 374 to the compaction chamber 330. In this example, the second line 381 delivers the un-evaporated liquid to the loading region 336 of the compaction chamber 330. The transportation of un-evaporated liquid is driven by a second pump 385.

While preferred embodiments of the present invention have been shown and described herein, various modifications may be made thereto without departing from the inventive idea of the present invention. Accordingly, it is to be understood the present invention has been described by way of illustration and not limitation. Other embodiments are within the scope of the following claims.

The invention claimed is:

1. A vehicle for collecting and compacting waste for disposal,
comprising:
a compaction chamber, configured to receive and compact waste, including an opening for inserting waste to be compacted and a plurality of apertures in at least one internal surface of the compaction chamber;
a compactor, configured to apply pressure to the waste in the compaction chamber to reduce a volume of the waste, wherein, when the compactor applies pressure to the waste, liquid and residual solid waste exits the compaction chamber through the plurality of apertures; and
a liquid collection system, configured to collect the liquid and the residual solid waste from the plurality of apertures; wherein the liquid collection system includes an evaporation system configured to evaporate at least a portion of the liquid removed from the waste, and wherein the evaporation system includes at least one heater.

2. The vehicle of claim 1, wherein the liquid collection system further includes a filter unit configured to receive the liquid and the residual solid waste from the plurality of apertures; the filter unit including a filter through which the liquid passes, the residual solid waste remaining on a surface of the filter.

3. The vehicle of claim 2, wherein the filter unit further includes a first end, a second end, and a scraper device; the filter being positioned between the first end and the second end, and the second end including an opening in communication with the compaction chamber; wherein the scraper device is configured to travel in an extension mode from the first end to the second end across the surface of the filter to remove the residual solid waste from the filter and force the residual solid waste out of the opening of the second end and into the compaction chamber and to travel in a retraction mode from the second end to the first end.

4. The vehicle of claim 3, wherein the filter unit further includes a closure assembly for sealing the opening in the second end; wherein the closure assembly is configured to open when the scraper device forces the residual solid waste out of the filter unit into the compaction chamber through the opening in the extension mode and wherein the closure assembly is configured to close after the scraper device travels to a position within the opening in the retraction mode.

5. The vehicle of claim 3, wherein the filter unit includes a first actuator interconnected to the scraper device and configured to extend the scraper device in the extension mode from a retracted position proximate the first end to an extended position to cause the scraper device to remove the residual solid waste from the filter and force it out of the opening of the filter unit and configured to retract the scraper device in the retraction mode from the extended position proximate the second end to the retracted position.

6. The vehicle of claim 4, wherein the closure assembly includes a door and at least one spring affixed to the door to bias the door in a closed position, and wherein the scraper device opens the door as it is forced against the door when it moves to the extended position in the extension mode and the door closes due to the spring bias as the scraper devices moves toward the retracted position in the retraction mode.

7. The vehicle of claim 5, wherein the filter unit further includes a pair of guide members each having a top and a bottom surface, the guide members being disposed on opposite sides of the surface of the filter and extending from proximate the first end to proximate the second end of the filter unit; the scraper device traveling under the bottom surfaces of the guide members as the scraper devices moves from the retracted position to the extended position in the extension mode to maintain contact between the scraper device and the filter and the scraper device being in contact with the top surfaces of the guide members as the scraper device moves from the extended position to the retracted position in the retraction mode to maintain separation between the scraper device and the filter.

8. The vehicle of claim 7, wherein the filter unit further includes a second actuator, configured to move the scraper device away from the surface of the filter and position the scraper device on the top surfaces of the guide members as the scraper devices moves from the extended to the retracted position in the retraction mode to maintain separation between the scraper device and the surface of the filter.

9. The vehicle of claim 7, wherein the bottom surfaces of the guide members are positioned a distance less than or equal to a height of the scraper device from the surface of the filter to provide a downward force from the scraper device on the surface of the filter as the scraper device travels in an extension mode from the first end to the second end across the filter.

10. The vehicle of claim 1, wherein the plurality of apertures have a width ranging from ¼ inch to ¹⁄₃₂ inch.

11. The vehicle of claim 2, wherein the filter comprises a filter material having a plurality of openings with a width ranging from 0.01 inch to 0.05 inch.

12. The vehicle of claim 11, wherein the filter further comprises a perforated plate to support the filter material.

13. The vehicle of claim 2, wherein the liquid collection system further comprises a liquid collection chamber in communication with the filter unit, the liquid collection chamber configured to receive the liquid from the filter unit.

14. The vehicle of claim 13, wherein the evaporation system includes an evaporation chamber in communication with the liquid collection chamber and configured to receive and evaporate the liquid.

15. The vehicle of claim 14, wherein the evaporation chamber includes at least one nozzle through which the liquid from the liquid collection chamber flows to produce a spray in the evaporation chamber.

16. The vehicle of claim 15, wherein the evaporation chamber includes a first heater to heat the spray to at least above 32 degrees F. to cause the spray to evaporate.

17. The vehicle of claim 16, wherein the first heater heats the spray to approximately 140 degrees F.

18. The vehicle of claim 16, wherein the first heater includes an aperture for receiving the exhaust gas of the vehicle to provide heat.

19. The vehicle of claim 18, wherein the first heater has a surface area and the first heater includes one or more fins to increase the surface area of the first heater.

20. The vehicle of claim 16, wherein the evaporation system includes a second heater to preheat the liquid prior to the liquid flowing through the nozzle.

21. The vehicle of claim 20, wherein the second heater includes an aperture for receiving the exhaust gas of the vehicle to provide heat.

22. The vehicle of claim 20, wherein the second heater has a surface area and the second heater includes one or more fins to increase the surface area of the second heater.

23. The vehicle of claim 16, wherein the evaporation system includes line interconnecting the evaporation chamber to the compaction chamber to transport un-evaporated liquid from the evaporation chamber to the compaction chamber.

24. The vehicle of claim 15, including a line for transporting the liquid between the liquid collection system chamber and the evaporation chamber and a first filtration unit disposed in the line to remove particles from the liquid.

25. The vehicle of claim 24, wherein the liquid is transported from the liquid collection system to the evaporation chamber by a pump.

26. The vehicle of claim 24, wherein the size of the particles removed by the first filtration unit range from 0.5 micron to 5 microns.

27. The vehicle of claim 24, further including a second filtration unit disposed in the line to remove hydrocarbons and odor from the liquid and wherein the second filtration unit comprises activated carbon.

28. A vehicle for collecting and compacting waste for disposal, comprising:
   a vehicle frame; and
   a compaction system mounted on the vehicle frame, wherein the compaction system, includes:
   a compaction chamber, configured to receive and compact waste, including an opening for inserting waste to be compacted and a plurality of apertures in at least one internal surface of the compaction chamber;
   a compactor, configured to apply pressure to the waste in the compaction chamber to reduce a volume of the waste, wherein, when the compactor applies pressure to the waste, liquid and residual solid waste exits the compaction chamber through the plurality of apertures; and
   a liquid collection system, configured to collect the liquid and residual solid waste from the plurality of apertures, wherein the liquid collection system includes a filter unit and an evaporation system configured to evaporate at least a portion of the liquid removed from the waste; wherein the filter unit is configured to separate the liquid and the residual solid waste, the filter unit including an opening in communication with the compaction chamber to enable the residual solid waste to be moved into the compaction chamber.

* * * * *